US012397560B2

(12) United States Patent
Ito et al.

(10) Patent No.: US 12,397,560 B2
(45) Date of Patent: Aug. 26, 2025

(54) LIQUID DISCHARGE APPARATUS

(71) Applicant: CANON KABUSHIKI KAISHA, Tokyo (JP)

(72) Inventors: Masashi Ito, Tokyo (JP); Yuri Mori, Tokyo (JP); Takashi Abe, Kanagawa (JP); Nanae Uchinuno, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/443,210

(22) Filed: Feb. 15, 2024

(65) Prior Publication Data

US 2024/0181787 A1 Jun. 6, 2024

Related U.S. Application Data

(63) Continuation of application No. 17/584,265, filed on Jan. 25, 2022, now Pat. No. 11,932,024.

(30) Foreign Application Priority Data

Feb. 12, 2021 (JP) ................................ 2021-021066

(51) Int. Cl.
*B41J 2/14* (2006.01)
*B41J 2/175* (2006.01)

(52) U.S. Cl.
CPC ....... *B41J 2/17596* (2013.01); *B41J 2/17503* (2013.01); *B41J 2/14* (2013.01)

(58) Field of Classification Search
CPC .... B41J 2/175; B41J 2/17506; B41J 2/17509; B41J 2/17513; B41J 2/1752;
(Continued)

(56) References Cited

U.S. PATENT DOCUMENTS

| | | | |
|---|---|---|---|
| 9,421,781 B2 | 8/2016 | Kimura et al. | ........ B41J 2/1752 |
| 10,131,154 B2 | 11/2018 | Matsumura et al. | |

(Continued)

FOREIGN PATENT DOCUMENTS

| | | |
|---|---|---|
| CN | 106626786 | 5/2017 |
| CN | 108528045 | 9/2018 |

(Continued)

OTHER PUBLICATIONS

Extended European Search Report dated Jun. 27, 2022 in counterpart EP Application No. 22152918.3.

(Continued)

*Primary Examiner* — Anh T Vo
(74) *Attorney, Agent, or Firm* — Venable LLP

(57) ABSTRACT

An apparatus includes a container configured to store a liquid to be supplied to a discharge unit, a first cover portion capable of moving between a closing position where an inlet portion in the container is covered and an opening position, a second cover portion capable of moving between a closing position where the first cover portion is covered and an opening position where the first cover portion is exposed so as to be opened/closed, and a valve which opens/closes a passage communicating with an inside of the container. The valve closes the passage interworking with a movement of the first cover portion to the opening position, and opens the passage interworking with a movement of the second cover portion to the closing position.

17 Claims, 16 Drawing Sheets

(58) Field of Classification Search
CPC .. B41J 2/17523; B41J 2/1754; B41J 2/17553; B41J 29/02; B41J 29/13
See application file for complete search history.

(56) References Cited

U.S. PATENT DOCUMENTS

| | | | | |
|---|---|---|---|---|
| 10,308,029 | B2 | 6/2019 | Kudo et al. | |
| 10,336,085 | B2 | 7/2019 | Arai et al. | B41J 2/17553 |
| 10,538,096 | B2 | 1/2020 | Abe et al. | B41J 2/175 |
| 10,618,292 | B2 * | 4/2020 | Fukasawa | B41J 2/17523 |
| 10,654,283 | B2 | 5/2020 | Saeki et al. | B41J 2/17566 |
| 10,759,181 | B2 | 9/2020 | Tokisawa et al. | B41J 2/17596 |
| 11,072,195 | B2 | 7/2021 | Kida et al. | B41J 29/13 |
| 11,135,852 | B2 | 10/2021 | Toki et al. | B41J 2/175 |
| 2011/0215565 | A1 * | 9/2011 | Bauer | F16L 55/07 285/129.1 |
| 2017/0355197 | A1 | 12/2017 | Kudo et al. | |
| 2018/0250943 | A1 | 9/2018 | Fukasawa et al. | |
| 2018/0311964 | A1 | 11/2018 | Tanaka et al. | |
| 2020/0316951 | A1 | 10/2020 | Narazaki et al. | |
| 2020/0316973 | A1 | 10/2020 | Toki et al. | B41J 29/38 |
| 2020/0346468 | A1 | 11/2020 | Tokisawa et al. | B41J 2/17596 |
| 2021/0060958 | A1 | 3/2021 | Yashiro et al. | B41J 2/175 |
| 2021/0309031 | A1 | 10/2021 | Kida et al. | B41J 2/16517 |

FOREIGN PATENT DOCUMENTS

| | | | | |
|---|---|---|---|---|
| CN | 111791598 | | 10/2020 | |
| EP | 1164025 | * | 12/2001 | B41J 2/175 |
| EP | 1164025 A1 | * | 12/2001 | B41J 2/175 |
| EP | 3162573 | | 5/2017 | |
| JP | 2014-079910 | | 5/2014 | |
| JP | 2018-069705 | | 5/2018 | |

OTHER PUBLICATIONS

Office Action dated Apr. 18, 2025 in counterpart Chinese Application No. 202210125794.9, together with English translation thereof.

* cited by examiner

FIG. 11A
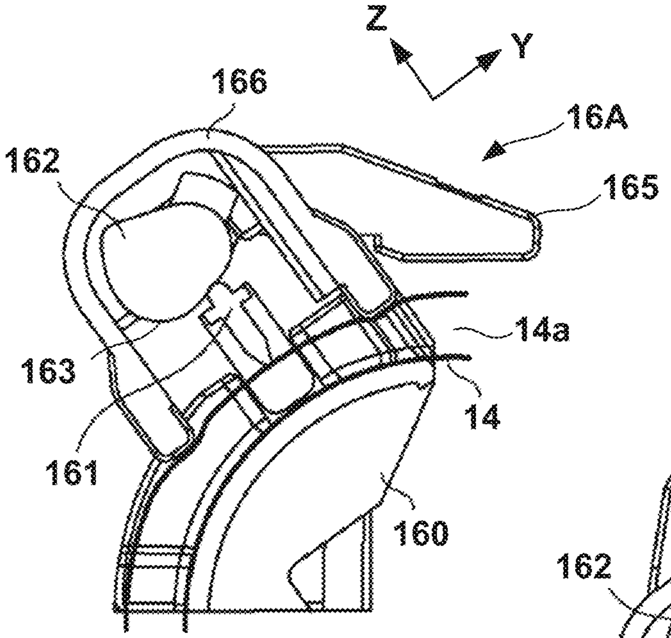
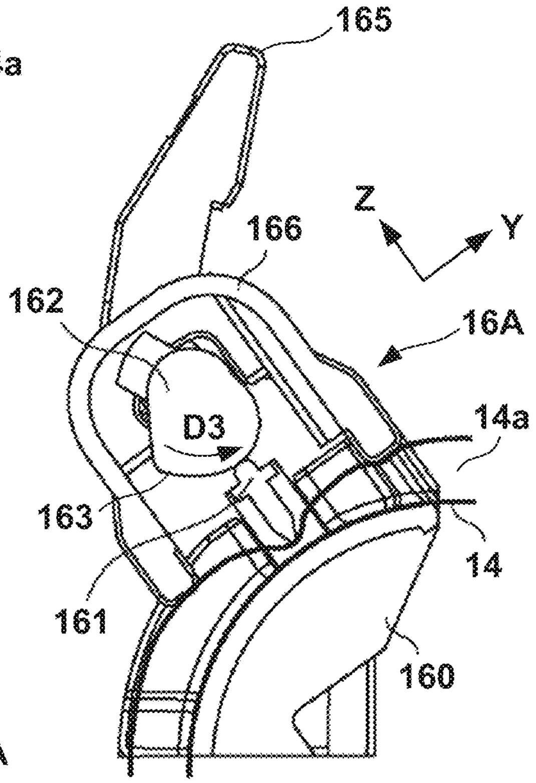
FIG. 11C
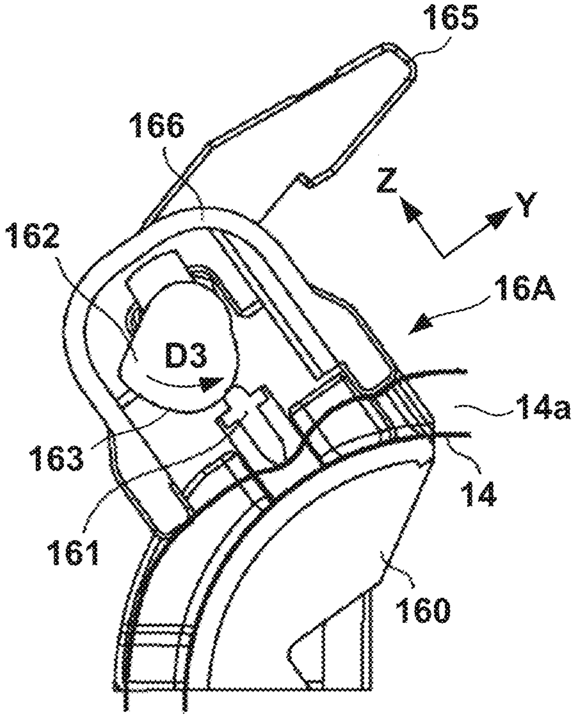
FIG. 11B

LIQUID DISCHARGE APPARATUS

This application is a continuation of application Ser. No. 17/584,265 filed Jan. 25, 2022, currently pending; and claims priority under 35 U.S.C. § 119 to Japan Application JP 2021-021066 filed in Japan on Feb. 12, 2021; and the contents of all of which are incorporated herein by reference as if set forth in full.

BACKGROUND OF THE INVENTION

Field of the Invention

The present invention relates to a liquid discharge apparatus.

Description of the Related Art

As an example of a liquid discharge apparatus, a printing apparatus for printing an image by discharging ink to a print medium such as paper is known. Japanese Patent Laid-Open No. 2014-79910 discloses a printing apparatus including an ink tank including an inlet port configured to replenish ink, a printhead configured to discharge the ink supplied from the ink tank, and a valve capable of opening/closing a passage between the printhead and the ink tank. When replenishing the ink, the valve is closed.

In the apparatus described in Japanese Patent Laid-Open No. 2014-79910, a user manually performs the valve opening/closing operation. If the user erroneously performs the opening/closing operation, for example, if printing is performed in a state in which the valve is closed, a discharge failure may occur because the ink is not supplied from the ink tank to the printhead. Additionally, for example, if the ink is replenished to the ink tank in a state in which the valve is open, the ink may leak from the printhead.

SUMMARY OF THE INVENTION

The present invention provides a technique capable of preventing erroneous opening/closing of a valve.

According to an aspect of the present invention, there is provided a liquid discharge apparatus comprising: a container configured to store a liquid to be supplied to a discharge unit configured to discharge the liquid; a first cover portion capable of moving between a closing position where an inlet portion, which is provided in the container and through which the liquid is injected into the container, is covered and an opening position where access to the inlet portion is permitted; a second cover portion capable of moving between a closing position where the first cover portion is covered and an opening position where the first cover portion is exposed so as to be opened/closed; and a valve configured to open/close a passage communicating with an inside of the container, wherein the valve is configured to close the passage interworking with a movement of the first cover portion to the opening position, and open the passage interworking with a movement of the second cover portion to the closing position.

Further features of the present invention will become apparent from the following description of exemplary embodiments (with reference to the attached drawings).

BRIEF DESCRIPTION OF THE DRAWINGS

FIGS. 11A to 11C are explanatory views of the operation of the valve;

DESCRIPTION OF THE EMBODIMENTS

Figure 1:
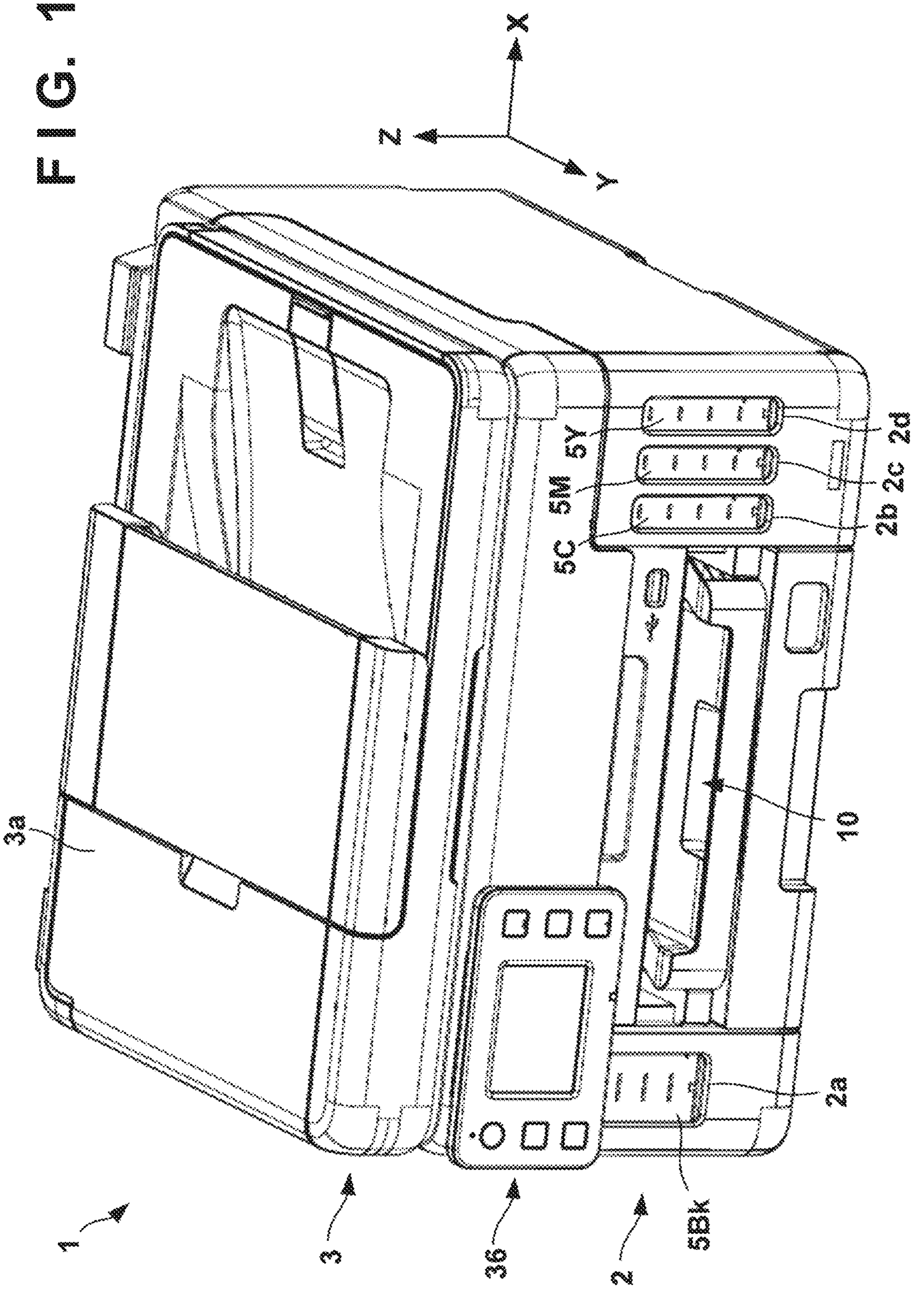
FIG. 1 is a view showing the outer appearance of a liquid discharge apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

<Outline of Liquid Discharge Apparatus>

FIG. 1 is a view showing the outer appearance of a liquid discharge apparatus 1 according to an embodiment of the present invention, which is viewed from the front side. The liquid discharge apparatus 1 according to this embodiment is an inkjet printing apparatus configured to perform printing on a print medium by discharging ink as a liquid. The present invention can be applied to various kinds of liquid discharge apparatuses other than the inkjet printing apparatus. In FIG. 1, arrows X and Y indicate horizontal directions orthogonal to each other, and an arrow Z indicates a vertical direction (gravity direction). The X direction is the widthwise direction (left-and-right direction) of the liquid discharge apparatus 1. The Y direction is the depth direction of the liquid discharge apparatus 1.

Note that "print" includes not only formation of significant information such as a character or graphic pattern but also formation of an image, design, or pattern on print media in a broader sense and processing of print media regardless of whether the information is significant or insignificant or has become obvious to allow human visual perception. Also, in this embodiment, "print medium" is assumed to be sheet-shaped paper but may be a fabric, a plastic film, or the like.

The liquid discharge apparatus 1 has a flat rectangular parallelopiped shape as a whole, and includes an apparatus main body 2 and a cover portion 3. The cover portion 3 is provided to cover the apparatus main body 2, and constitutes the top part of the liquid discharge apparatus 1. The cover portion 3 according to this embodiment is provided with a reading unit (scanner unit) 3*a* that reads the image of an original. A discharge portion 10 to which a printed print medium is discharged is formed in the front portion of the liquid discharge apparatus 1. In addition, an operation unit 36 that accepts a user operation is provided in the front portion of the liquid discharge apparatus 1. The operation unit 36 includes a touch panel type display unit, and accepts an input operation of the user and displays information to the user.

A plurality of window portions 2*a* to 2*d* are formed in a housing that forms the outer wall of the apparatus main body 2. The user can visually recognize components inside the apparatus main body 2 via the window portions 2*a* to 2*d*. In this embodiment, the user can visually recognize the remaining amounts of liquids stored in containers 5Bk, 5C, 5M, and 5Y (to be referred to as a container 5 hereinafter collectively or without distinction) via the window portions 2*a* to 2*d*. The container 5 is an ink tank that store ink as a liquid, and the four containers 5 store different types of ink. In this embodiment, black ink is stored in the container 5Bk, cyan ink is stored in the container 5C, magenta ink is stored in the container 5M, and yellow ink is stored in the container 5Y. Note that the types of ink are not limited to the four types, as in this embodiment. One type of ink may be used, or a plurality of types of inks other than four types may be used. The number of containers 5 need only be equal to or more than the number of types of liquid ink.

Figure 2:
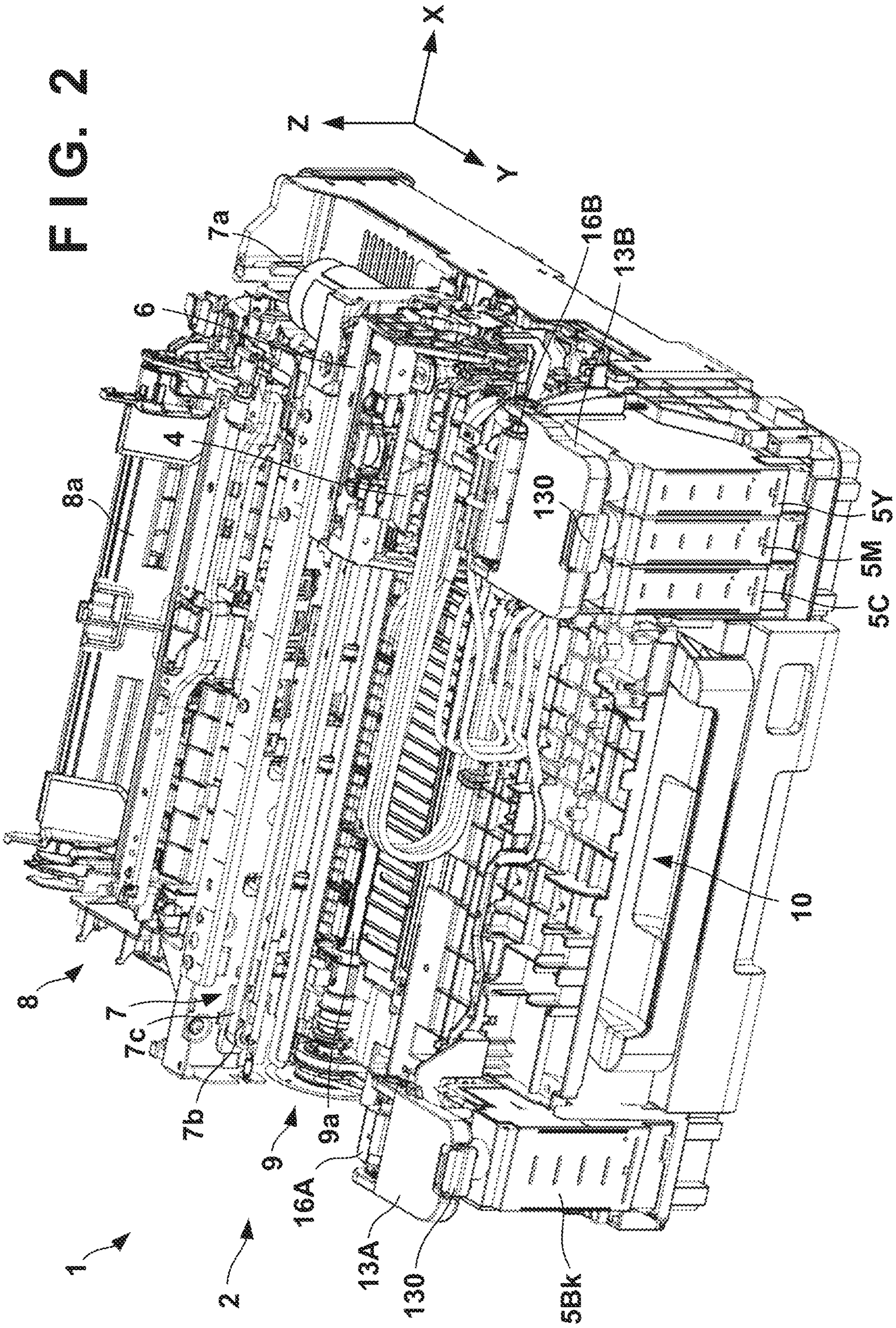
FIG. 2 is an explanatory view showing the internal mechanism of the liquid discharge apparatus shown in FIG. 1.

FIG. 2 is an explanatory view showing the internal mechanism of the liquid discharge apparatus 1. The liquid discharge apparatus 1 includes a discharge head 4 that discharges a liquid. The discharge head 4 according to this embodiment is a printhead that performs printing by discharging ink supplied from the container 5 to a print medium. The discharge head 4 includes a discharge surface 4*a* (see FIG. 3) in which a plurality of nozzles configured to discharge ink are formed. Each nozzle is provided with, for example, an electrothermal transducer (heater). The electrothermal transducer heats and foams the ink by energization, and the ink is discharged by the foaming energy.

The discharge head 4 is mounted on a carriage 6. The carriage 6 is reciprocated in the X direction (main scanning direction) by a driving unit 7. The driving unit 7 includes a driving pulley and a driven pulley (only a driven pulley 7*b* is shown in FIG. 2) arranged apart in the X direction, an endless belt 7*c* wound around the pulleys, and a carriage motor 7*a* serving as a driving source that rotates the driving pulley. The carriage 6 is connected to the endless belt 7*c*. When the endless belt 7*c* is made to travel, the carriage 6 moves in the X direction. In the process of the movement of the carriage 6, the ink is discharged from the discharge head 4 to the print medium, thereby printing an image. This operation is sometimes called print scanning.

As described above, the liquid discharge apparatus 1 according to this embodiment is a serial type inkjet printing apparatus in which the discharge head 4 is mounted on the carriage 6 that reciprocates. However, the present invention can also be applied to another printing apparatus such as an inkjet printing apparatus including a so-called full line discharge head (printhead) provided with a plurality of nozzles configured to discharge a liquid to a region corresponding to the width of a print medium.

The liquid discharge apparatus 1 includes a feeding unit 8 and a conveying unit 9, which convey a print medium. The feeding unit 8 includes a tray 8*a* on which sheet-shaped print media are stacked, and a feeding mechanism (not shown) for the print medium. The feeding mechanism includes, for example, a feeding roller that feeds the print medium on the tray 8*a*, and a feeding motor 8*b* (FIG. 4) serving as a driving source that rotates the feeding roller.

The conveying unit 9 is a mechanism that conveys, in the Y direction (sub-scanning direction), the print medium fed from the feeding unit 8. The conveying unit 9 includes a conveying roller 9*a*, and a conveying motor 9*b* (FIG. 4) serving as a driving source that rotates the conveying roller 9*a*. A pinch roller (not shown) is pressed against the conveying roller 9*a*, and the print medium is clamped by the nip portion between these. When the conveying roller 9*a* rotates, the print medium is intermittently conveyed to the discharge head 4. The printing operation is performed by alternatively repeating the print medium conveying operation by the conveying unit 9 and print scanning.

In this embodiment, the container 5 is a stationary type container fixed in the liquid discharge apparatus 1. If the remaining ink amount decreases, the user replenishes ink in the container 5 without removing the container 5 from the liquid discharge apparatus 1.

The containers 5C, 5M, and 5Y are containers of the same structure, and the container 5Bk is a container having a larger capacity than the containers 5C, 5M, and 5Y. Hence, the container 5Bk is a container having a width wider in the X direction than the containers 5C, 5M, and 5Y. The container 5Bk is arranged at the left end portion of the front portion of the liquid discharge apparatus 1. The containers 5C to 5Y are arranged side by side in the X direction at the right end portion of the front portion of the liquid discharge apparatus 1. That is, these are arranged such that the discharge portion 10 is located between the container 5Bk and the containers 5C to 5Y. The upper portion of the container 5Bk is covered with a cover portion 13A, and the upper portions of the containers 5C to 5Y are covered with a cover portion 13B common to these.

<Structure of Container>

Figure 3:
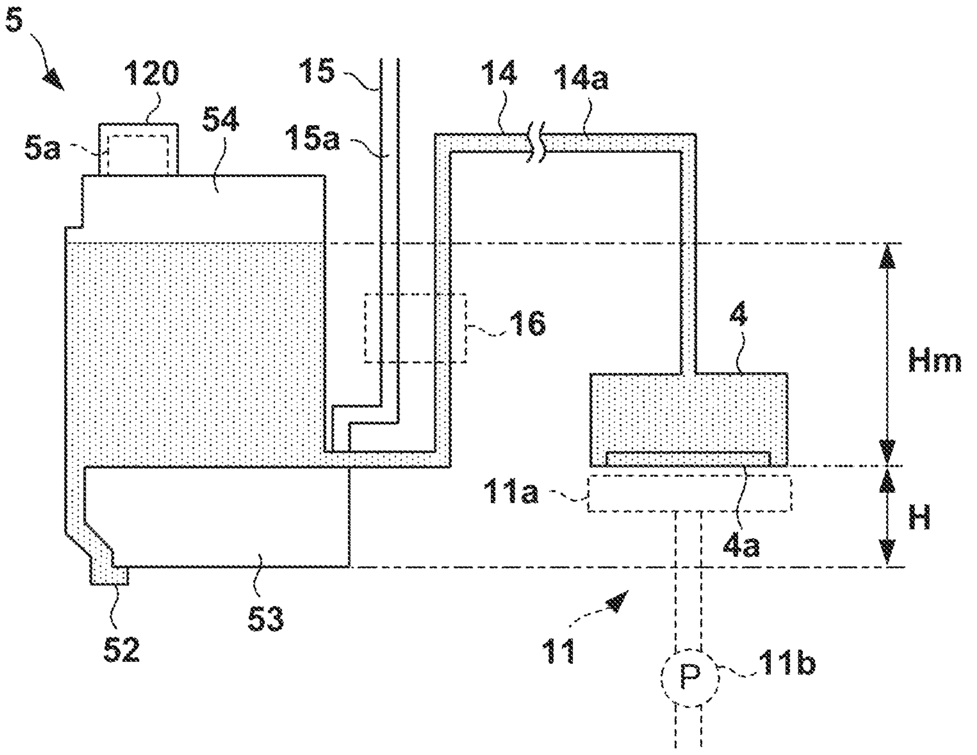
FIG. 3 is an explanatory view of a container and a configuration on the periphery.

FIG. 3 schematically shows the container 5 and a structure on the periphery. As described above, the container 5Bk and the containers 5C to 5Y basically have the structure shown in FIG. 3, although the capacities are different. The container 5 includes a storage portion 54 that stores ink, a gas-liquid exchange portion 52, and a buffer chamber 53. The gas-liquid exchange portion 52 is a portion in which the same amount of air as the ink discharged from the discharge head 4 is introduced, and the ink is normally held at the position shown in FIG. 3 by the meniscus of the ink. The buffer chamber 53 can store the ink that is pushed out as the meniscus of the ink in the gas-liquid exchange portion 52 is broken when the air in the storage portion 54 expands due to an atmospheric pressure variation, a temperature change, or the like. The upper portion of the container 5 is provided with an inlet portion 5*a* for a replenishing liquid (replenishing ink). The inlet portion 5*a* is closed by a cap portion 120. When replenish the ink, the user performs an ink replenishing work in a state in which the cap portion 120 is removed from the inlet portion 5a to open the inlet portion 5a. The cap portion 120 is provided for each container 5 (cap portions 120Bk, 120C, 120M, and 120Y, as will be described later).

Passages 14a and 15a communicate in the container 5. The passage 14a is a liquid supply path (ink supply path) communicating with the storage portion 54 and configured to supply ink from the container 5 to the discharge head 4, and is formed by a supply tube 14 that is a flexible tube. The passage 15a is an atmosphere communicating path communicating with the buffer chamber 53 and configured to make the inside of the container 5 communicate with the atmosphere, and is formed by an atmosphere communicating tube 15 that is a flexible tube. A valve 16 simultaneously opens/closes the passages 14a and 15a. In this embodiment, as the valve 16, a valve 16A for the container 5Bk and a valve 16B common to the containers 5C to 5Y are provided, as shown in FIG. 2.

The gas-liquid exchange portion 52 is provided at a position lower than the discharge surface 4a of the discharge head 4 by a height H. That is, the gas-liquid exchange portion 52 is configured to apply a negative pressure by a water head difference corresponding to the height H to the discharge surface 4a. This can prevent the ink from leaking from the discharge surface 4a. In addition, the buffer chamber 53 is located in the lower portion of the container 5. This can prevent the ink from leaking from the atmosphere communicating path 15a.

A recovery unit 11 is a mechanism configured to maintain the ink discharge performance of the discharge head 4, and is arranged at one end of the moving range of the carriage 6. The recovery unit 11 includes a cap 11a that covers the discharge surface 4a of the discharge head 4, and a pump 11b configured to suck the ink from the discharge head 4 via the cap 11a. The cap 11a can be displaced, by a mechanism (not shown), between a position where the cap 11a covers the discharge surface 4a and a position where the cap 11a is separated from the discharge surface 4a. When the cap 11a covers the discharge surface 4a (capping), drying of the ink on the discharge surface 4a can be suppressed. Also, when the pump 11b is operated in a state in which the cap 11a caps the discharge surface 4a, it is possible to remove highly viscous ink adhered to the discharge head 4 or fill the passage 14a or the discharge head 4 with the ink. If the printing operation is performed in a state in which the passage 14a or the discharge head 4 is filled with the ink, the ink is supplied from the container 5 as much as the decrease amount (discharge amount) of ink from the discharge head 4.

<Control Unit>

Figure 4:
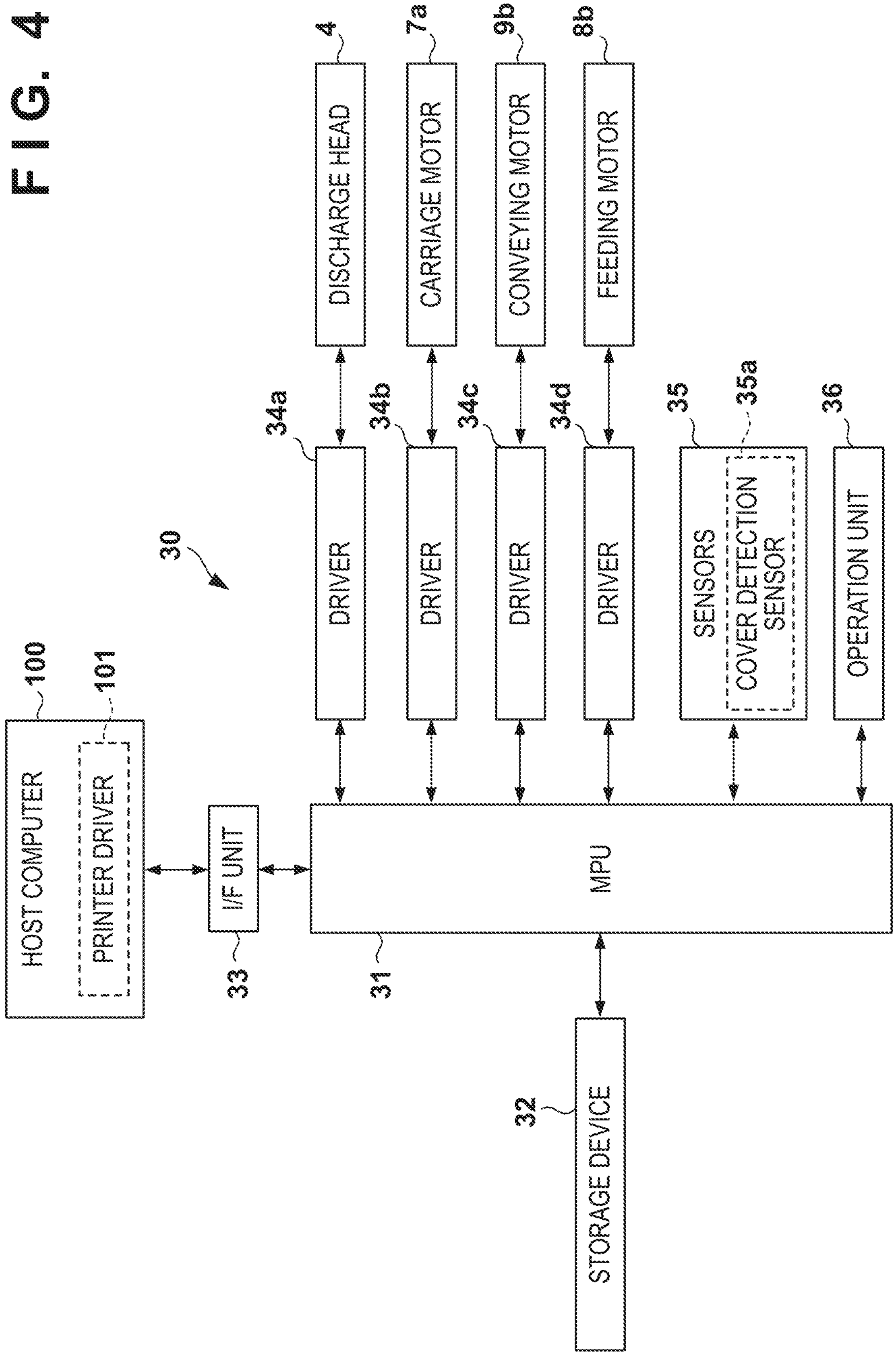
FIG. 4 is a block diagram of the control unit of the liquid discharge apparatus shown in FIG. 1.

FIG. 4 is a block diagram of a control unit 30 of the liquid discharge apparatus 1. An MPU 31 is a processor that controls each operation of the liquid discharge apparatus 1, data processing, and the like. The MPU 31 executes programs stored in a storage device 32, thereby controlling the whole liquid discharge apparatus 1. The storage device 32 is formed by, for example, a ROM or a RAM. The storage device 32 stores not only the programs to be executed by the MPU 31 but also various kinds of data necessary for processing, such as data received from a host computer 100.

The MPU 31 controls the discharge head 4 via a driver 34a. The MPU 31 controls the carriage motor 7a via a driver 34b. The MPU 31 also controls the conveying motor 9b and the feeding motor 8b via drivers 34c and 34d.

The MPU 31 also acquires detection results of various kinds of sensors 35 provided in the liquid discharge apparatus 1 and performs control operations. The sensors 35 include a cover detection sensor 35a. The MPU 31 also controls display of the display unit of the operation unit 36 and accepts a user operation on the operation unit 36.

The host computer 100 is, for example, a personal computer or a portable terminal (for example, a smartphone or a tablet terminal) used by the user. A printer driver 101 that performs communication between the host computer 100 and the liquid discharge apparatus 1 is installed in the host computer 100. The liquid discharge apparatus 1 includes an interface portion 33, and communication between the host computer 100 and the MPU 31 is executed via the interface portion 33. For example, if execution of the printing operation is input from the user to the host computer 100, the printer driver 101 collects the data of an image to be printed and settings concerning printing (information such as the quality of a printed image, and the like) and instructs the liquid discharge apparatus 1 to execute the printing operation.

<Operation upon Liquid Replenishing>

Figure 5A:
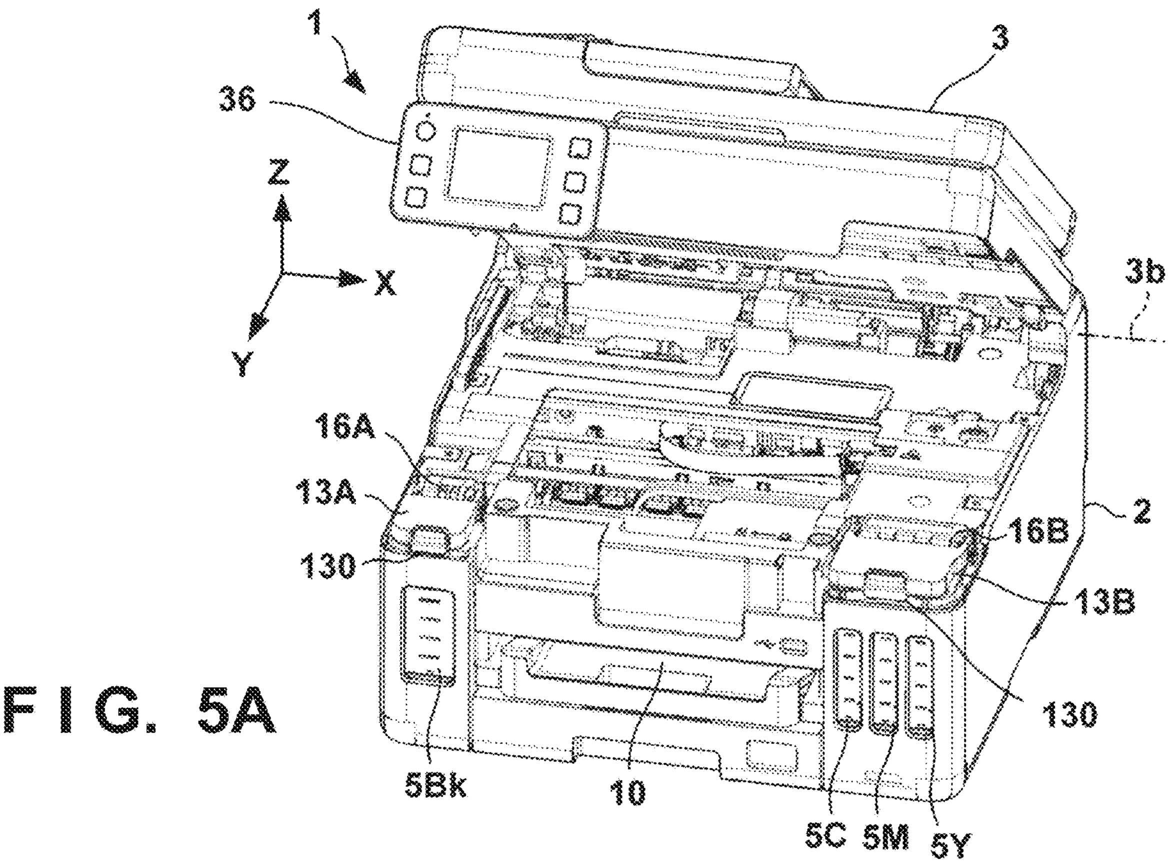
FIGS. 5A and 5B are explanatory views showing an ink replenishing procedure.

An operation procedure at the time of replenishing ink in the container 5 will be described with reference to FIGS. 5A to 6B. To replenish ink in the container 5, the inlet portion 5a needs to be exposed. In the liquid discharge apparatus 1 according to this embodiment, the cover portion 3 is configured to be movable, by a manual operation of the user, between a closing position (a position shown in FIG. 1) where the interior of the apparatus main body 2 is covered and an opening position where the interior of the apparatus main body 2 is exposed. FIG. 5A shows a state in which the cover portion 3 has moved to the opening position. In this embodiment, the cover portion 3 is supported by the apparatus main body 2 to be swingable between the opening position and the closing position. A swing center 3b of the cover portion 3 is parallel to the X direction, and is set in the rear portion of the cover portion 3 (and the apparatus main body 2). In other words, the front portion of the liquid discharge apparatus 1 is opened by the cover portion 3.

Figure 5B:
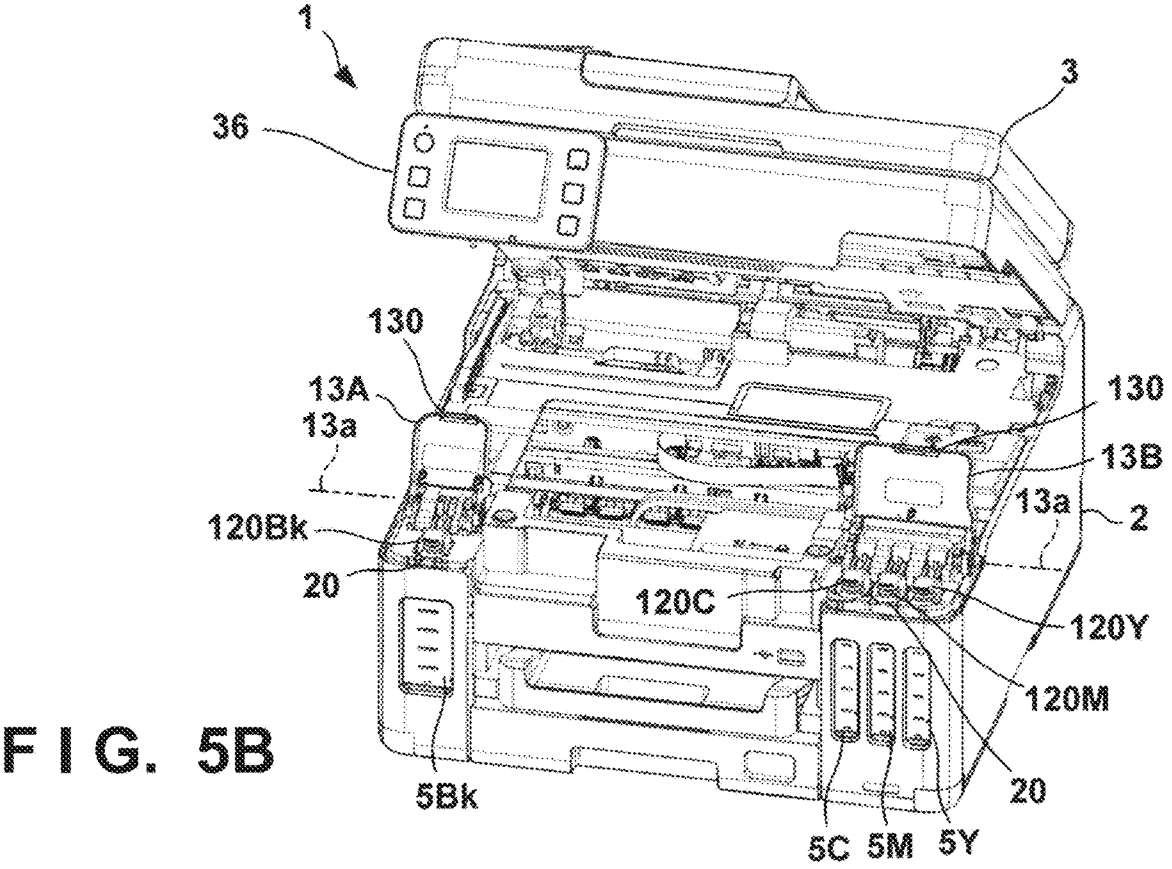

When the cover portion 3 moves to the opening position, the cover portions 13A and 13B covered with the cover portion 3 at the closing position are exposed. In the liquid discharge apparatus 1 according to this embodiment, each of the cover portions 13A and 13B is configured to be movable, by the manual operation of the user, between a closing position (a position shown in FIG. 5A) where the upper portion of the container 5 is covered and an opening position (a position shown in FIG. 5B) where the upper portion of the container 5 is exposed. FIG. 5A shows a state in which each of the cover portions 13A and 13B has moved to the closing position. In this embodiment, the cover portions 13A and 13B are supported by the apparatus main body 2 to be swingable between the opening position and the closing position. A swing center 13a of the cover portions 13A and 13B is parallel to the X direction, and is set in the rear portions of the cover portions 13A and 13B. The cover portion 13A covers the inlet portion 5a of the container 5Bk at the closing position, and exposes the inlet portion 5a at the opening position (normally, the inlet portion 5a is covered with the cap portion 120Bk, as shown in FIG. 5B). In other words, the user is allowed to access the inlet portion 5a in a state in which the cover portion 13A is located at the opening position. The cover portion 13B covers the inlet portions 5a of the containers 5C to 5Y at the closing position, and exposes the inlet portions 5a at the opening position (normally, each inlet portion 5a is covered with a corresponding one of the cap portions 120C to 120Y, as shown in FIG. 5B). In other words, the user is allowed to access the inlet portions 5*a* in a state in which the cover portion 13B is located at the opening position.

Figure 6A:
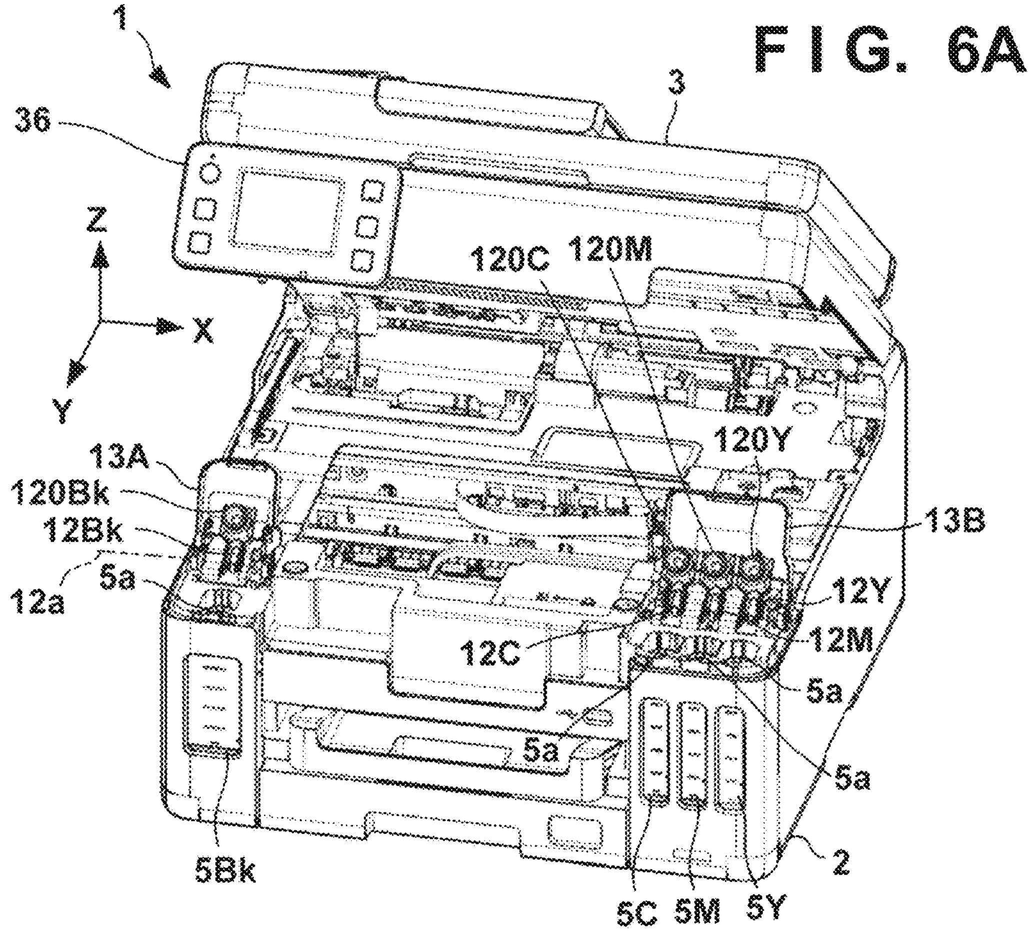
FIG. 6A is an explanatory view showing an ink replenishing procedure.
Figure 6B:
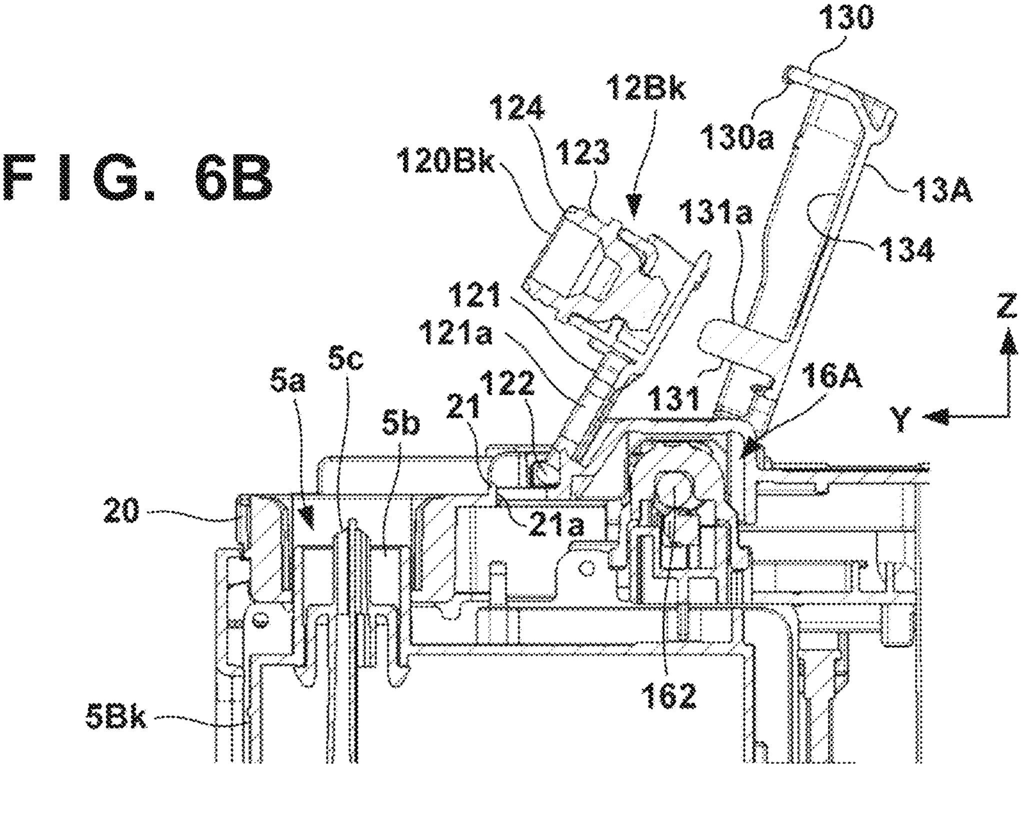
FIG. 6B is a sectional view showing the opening mode of an inlet portion.

When the cap portion 120 is removed from the container 5 as the target to replenish ink, the inlet portion 5*a* is exposed, and replenishment of ink is enabled. FIG. 6A shows a state in which the cap portions 120 of all the containers 5 are removed from the inlet portions 5*a*. FIG. 6B shows a state in which the cover portion 13A is located at the opening position, and the cap portion 120Bk is removed from the container 5Bk. The remaining containers 5C to 5Y, the cover portion 13B, and the cap portions 120C to 120Y are also in a similar mode. In this state, the user can replenish ink from the inlet portion 5*a* to the container 5. After the replenishment, the inlet portions 5*a* are closed by the cap portions 120, the cover portions 13A and 13B are moved to the closing position, and the cover portion 3 is also moved to the closing position. With the above-described procedure, the ink replenishing work is completed, and printing can be performed.

<Configurations of Cap Members and Cover Portions>

Figure 7A:
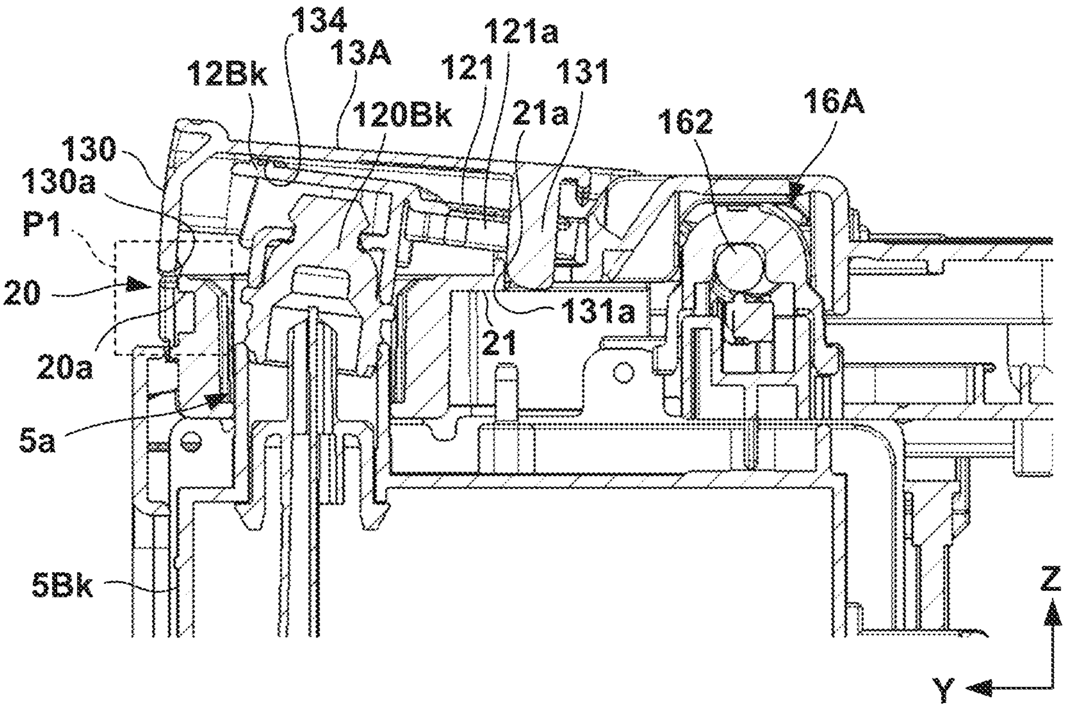
FIG. 7A is a view showing a state halfway through the movement of a cap member and a cover portion to a closing position.
Figure 7B:
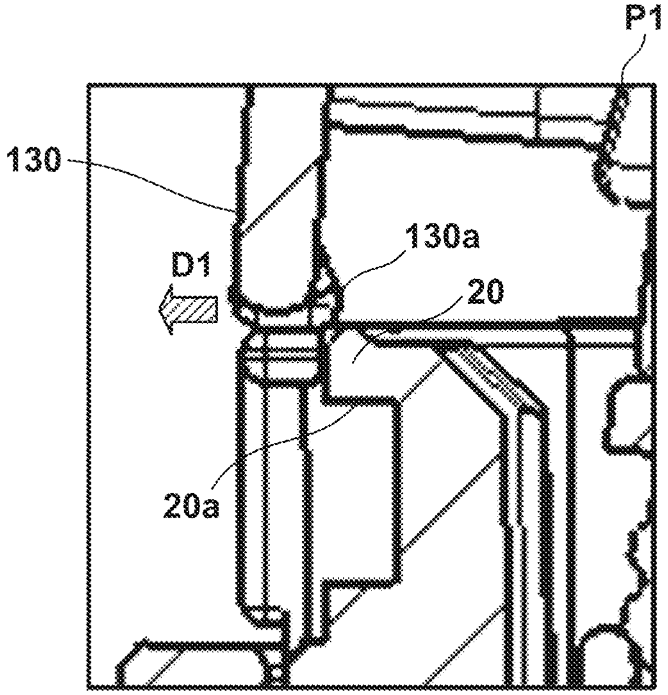
FIG. 7B is an enlarged view of a portion P1 in FIG. 7A.
Figure 8A:
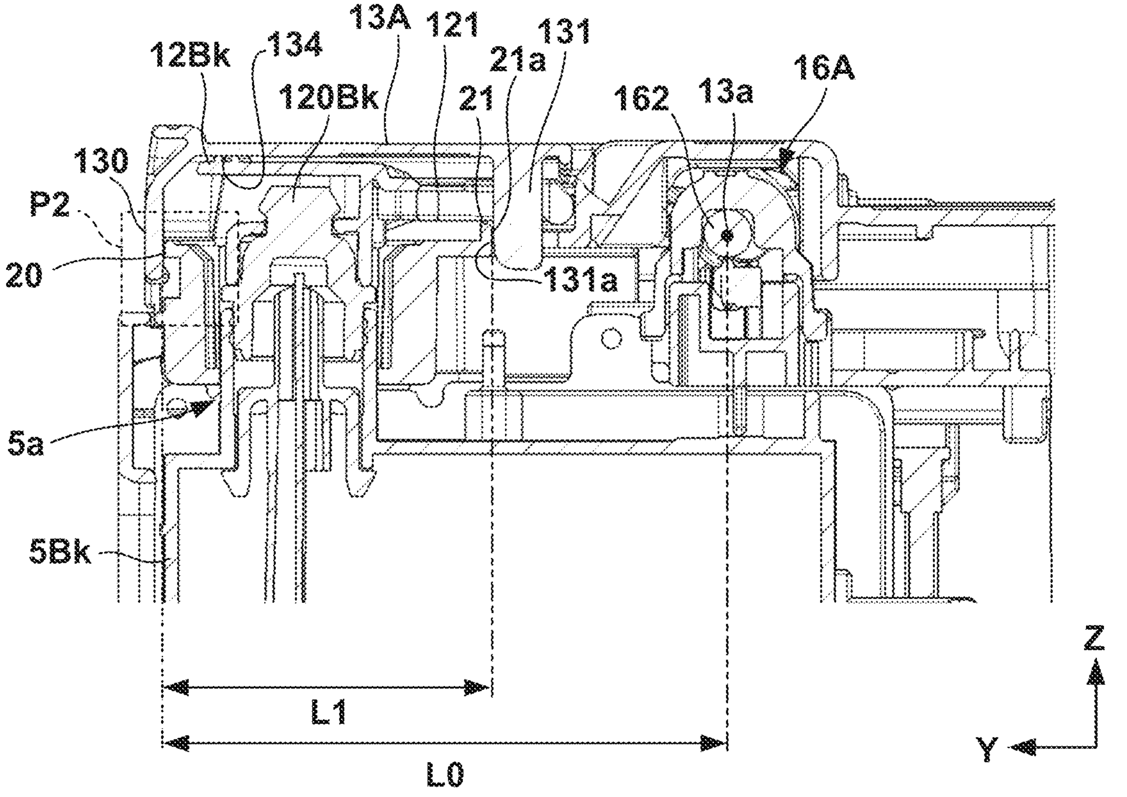
FIG. 8A is a view showing a state in which the cap member and the cover portion are moved to the closing position.
Figure 8B:
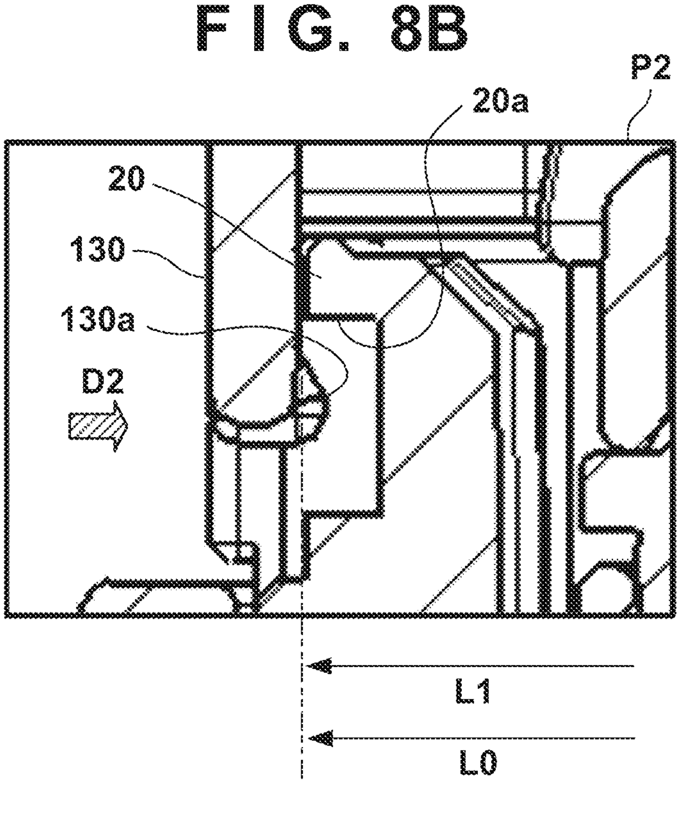
FIG. 8B is an enlarged view of a portion P2 in FIG. 8A.
Figure 9:
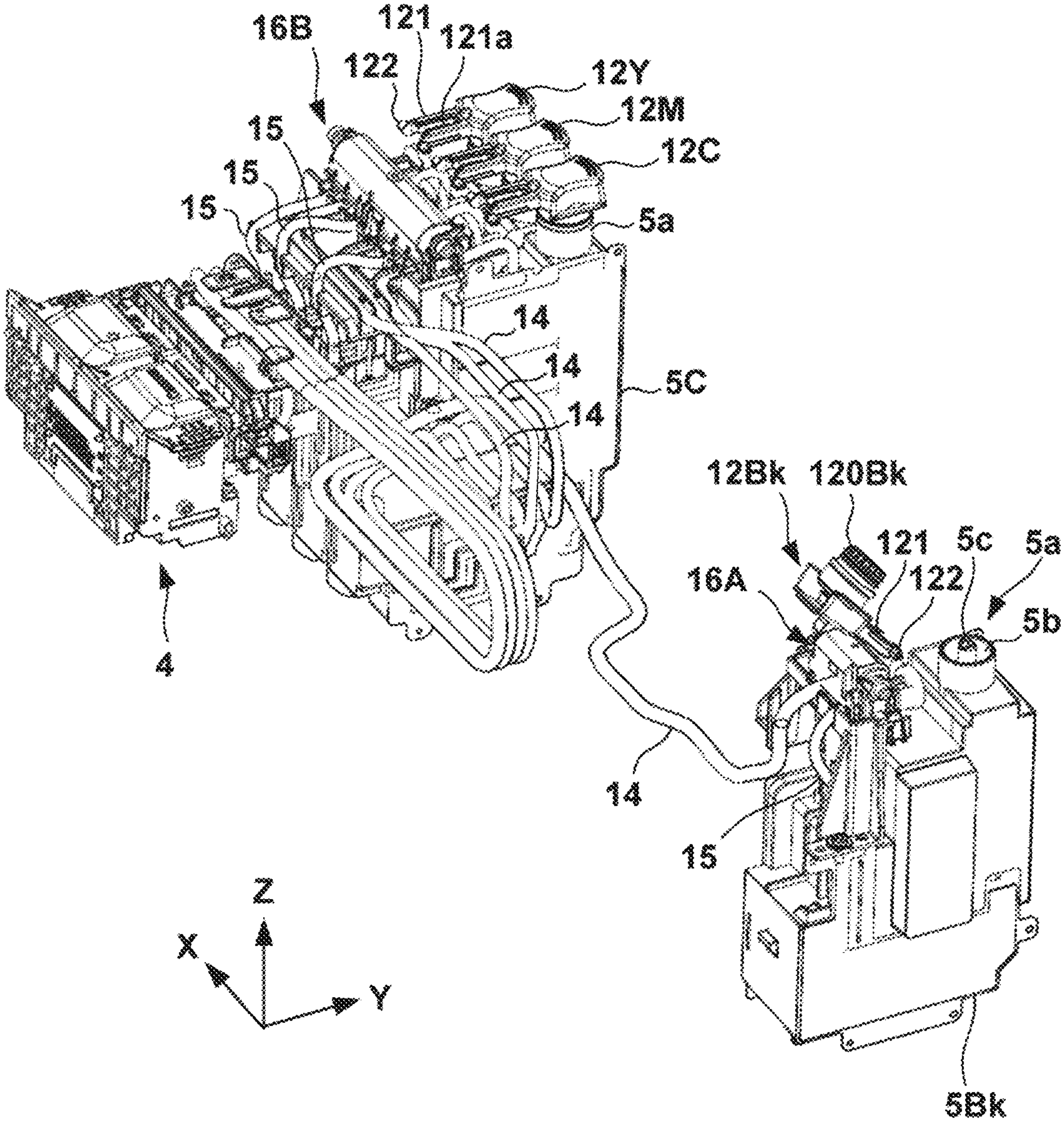
FIG. 9 is a perspective view showing the peripheral structures of the containers, valves, and a discharge head.
Figure 10B:
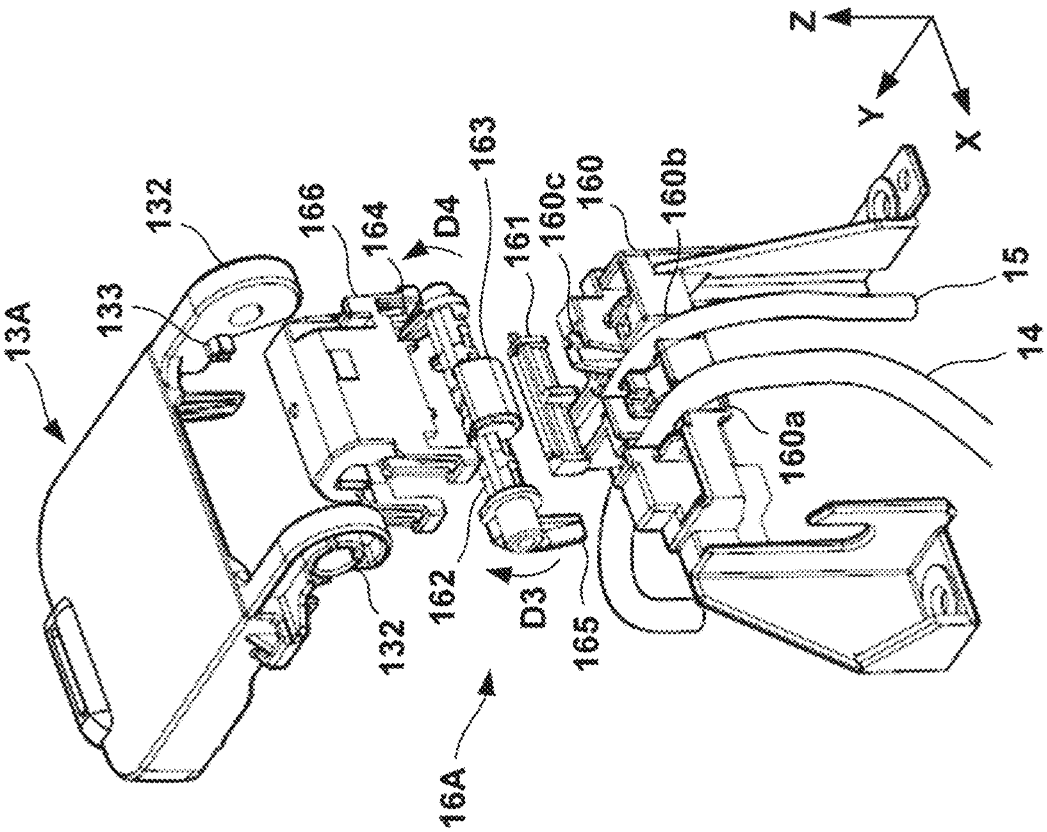
FIGS. 10A and 10B are explanatory views of the cover portion and the valve.
Figure 10A:
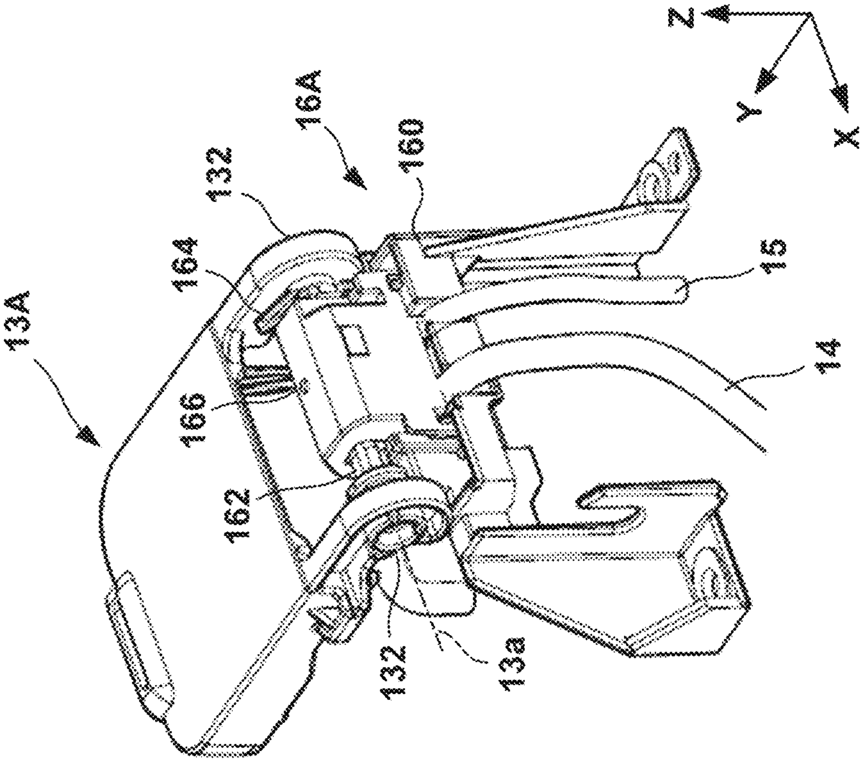

The cap portions 120Bk to 120Y are provided in cap members 12Bk to 12Y, respectively. The configuration of the cap members 12Bk to 12Y and the configuration of the cover portions 13A and 13B will be described with reference to FIGS. 6A to 10. FIG. 7A is a view showing a state halfway through the movement of the cap member 12Bk and the cover portion 13A to the closing position, and FIG. 7B is an enlarged view of a portion P1 in FIG. 7A. FIG. 8A is a view showing a state in which the cap member 12Bk and the cover portion 13A are moved to the closing position, and FIG. 8B is an enlarged view of a portion P2 in FIG. 8A. FIG. 9 is a perspective view showing the peripheral structures of the containers 5, the valves 16A and 16B, and the discharge head 4. FIGS. 10A and 10B are explanatory views of the cover portion 13A and the valve 16A.

Note that the configurations of the cap member 12Bk and the cover portion 13A will mainly be described here. The cap members 12C to 12Y and the cover portion 13B also have the same configurations.

The cap member 12Bk will be described first. The cap member 12Bk includes an arm portion 121. The cap portion 120Bk is exchangeably supported at one end portion of the arm portion 121, and a shaft portion 122 is formed at the other end portion. The arm portion 121 branches into two parts from the middle portion in the longitudinal direction toward the other end portion, and a gap 121*a* is formed there. The cap member 12Bk is supported by the apparatus main body 2 to be swingable at the shaft portion 122, and a swing center 12*a* (FIG. 6A) is parallel to the X direction.

The cap portion 120Bk is a tubular member that is open on the distal end side and closed on the base side. A seal portion 123 is formed in the middle part in the axial direction, and a distal end portion 124 defines a circular opening. The inlet portion 5*a* includes a cylindrical inlet hole 5*b*, and a tube portion 5*c* standing in the inlet hole 5*b*. An ink replenishing bottle is inserted into the inlet hole 5*b*, and ink in the bottle is injected into the container 5Bk via the tube portion 5*c*. Note that the distal end portion 124 is located on the distal end side of the cap portion 120Bk with respect to the seal portion 123 in the insertion direction to the inlet hole 5*b*.

The cap portion 12Bk can move between the opening position shown in FIG. 6B and the closing position shown in FIG. 8A. At the closing position, the cap portion 120Bk is inserted into the inlet hole 5*b* to close the inlet portion 5*a*. At the opening position, the cap portion 120Bk is separated from the inlet hole 5*b* to open the inlet portion 5*a*.

The user can lift the cap member 12Bk located at the closing position, thereby manually moving it to the opening position. Also, the user can press the cap member 12Bk located at the opening position, thereby manually moving it to the closing position.

In this embodiment, the cap member 12Bk is arranged in the swing space of the cover portion 13A, and the swing center 12*a* is located between the swing center 13*a* and the inlet portion 5*a* in the Y direction. For this reason, if the cover portion 13A is located at the closing position, the cap member 12Bk is covered with the cover portion 13A. Hence, the cap member 12Bk is prohibited to move to the opening position unless the cover portion 13A is moved to the opening position. When the cap member 12Bk is covered with the cover portion 13A, it is possible to prevent the cap member 12Bk from unexpectedly moving to the opening position to open the inlet portion 5*a* and make ink leak from the inlet portion 5*a*.

The cap member 12Bk can move alone from the opening position to the closing position. When the cover portion 13A is permitted to move from the opening position to the closing position, the cap member 12Bk can be moved from the opening position to the closing position. A pressing portion 134 that comes into contact with the cap member 12Bk in the movement from the opening position to the closing position is formed on the inner wall surface of the cover portion 13A. As shown in FIG. 7A, in the halfway stage of the movement of the cover portion 13A from the opening position to the closing position, the pressing portion 134 contacts the cap member 12Bk to move the cap member 12Bk to the closing position. When the user performs the operation of moving the cover portion 13A to the closing position after ink replenishment, the cap member 12Bk can also move to the closing position simultaneously to close the inlet portion 5*a*. Also, this configuration can prevent the user from forgetting to move the cap member 12Bk to the closing position (forgetting to close the inlet portion 5*a*).

The cover portion 13A will be described next. The cover portion 13A includes an engaging portion 130 at one end portion, and a pair of bearing portions 132 at the other end portion. The shaft portion of a cam member 162 of the valve 16A to be described later is inserted into the bearing portions 132, and the cover portion 13A is swingably supported around the shaft portion. The engaging portion 130 engages with an engaging portion 20 on the side of the apparatus main body 2. The engaging portion 20 is formed on a member provided on the inner side of the outer wall of the apparatus main body 2, and its position is immobile. By engaging with the engaging portion 130, the engaging portion 20 regulates the movement of the cover portion 13A from the closing position to the opening position and maintains the cover portion 13A at the closing position.

The engaging portion 130 according to this embodiment has a hook shape with a projecting portion 130*a* at the distal end portion, which projects to the side of the swing center 13*a* in the Y direction. On the other hand, the engaging portion 20 is a projecting portion projecting to the side opposite to the swing center 13*a* in the Y direction, and is formed by forming a concave portion on the lower side. When the projecting portion 130*a* comes into contact with a lower surface 20*a* of the engaging portion 20, the movement of the cover portion 13A from the closing position to the opening position is regulated. FIGS. 7A to 8B show the engaging mode between the engaging portion 130 and the engaging portion 20 when the cover portion 13A is moved from the opening position to the closing position.

When the user operates the cover portion 13A from the opening position to the closing position, the projecting portion 130*a* comes into contact with the engaging portion 20, as shown in FIGS. 7A and 7B, and the engaging portion 130 elastically deforms in the direction of an arrow D1 (in the direction opposite to the swing center 13*a* in the Y direction). When the projecting portion 130*a* gets over the engaging portion 20 downward, the engaging portion 130 elastically returns in the direction of an arrow D2 (to the side of the swing center 13*a* in the Y direction), as shown in FIGS. 8A and 8B. Hence, the engaging portion 130 and the engaging portion 20 engage with each other. When the user operates the cover portion 13A from the closing position to the opening position, the engaging portion 130 and the engaging portion 20 are disengaged by a reverse phenomenon. In this embodiment, the side of the engaging portion 130 elastically deforms, but reversely, the side of the engaging portion 20 may elastically deform. Alternatively, both may elastically deform. The engaging portion 130 and the engaging portion 20 may be displaced by elastically deforming one or both of them in a part of the cover portion 13A and the apparatus main body 2.

When the engaging portion 130 elastically deforms from the state shown in FIG. 7B to the state shown in FIG. 8B, an appropriate click feeling can be given to the user who performs the operation. This allows the user to sense that the cover portion 13A is moved to the closing position and set in the engaging state (that the inlet portion 5*a* is closed by the cap portion 120Bk).

Here, so that the user experiences a good click feeling, an interference amount (an overlapping amount in the Y direction in a natural state), which is generated when the projecting portion 130*a* gets over the engaging portion 20, needs to be appropriately managed. If the interference amount is large, the elastic deformation amount of the engaging portion 130, which is generated when the projecting portion 130*a* gets over the engaging portion 20, is large, and a large operation force is required from the user. If the operation force is large, the user may misidentify that the cover portion 13A has moved to the closing position. To the contrary, if the interference amount is small, the elastic deformation amount of the engaging portion 130 is small, and a sufficient click feeling may not be generated.

In design, the interference amount can be adjusted by a distance LO from the swing center 13*a* of the cover portion 13A to the projecting portion 130*a* and the engaging portion 20, as shown in FIG. 8A. However, in this embodiment, the cover portion 13A is swingably supported using the component (cam member 162) of the valve 16A. The interference amount may vary due to the dimension tolerance or assembly error of each component.

In this embodiment, the intermediate position of the cover portion 13A in the Y direction is decided at the closing position. More specifically, a plate-shaped contact portion 131 projecting from the inner wall surface of the cover portion 13A is provided integrally with the cover portion 13A. At a position between the swing center 13*a* and the engaging portion 130, the contact portion 131 projects in a direction crossing the direction of connecting the swing center 13*a* and the engaging portion 130. At the closing position of the cover portion 13A, the contact portion 131 projects downward in the Z direction. A contact portion 21 that comes into contact with the contact portion 131 is provided on the side of the apparatus main body 2.

A contact operation between the contact portion 131 and the contact portion 21 will be described with reference to FIGS. 7A and 8A. FIG. 7A shows a state halfway through the movement of the cover portion 13A from the opening position to the closing position. A contact surface 131*a* of the contact portion 131 includes a curved surface on the distal end side and a flat surface on the remaining portion. In the stage shown in FIG. 7A, the distal end side of the contact surface 131*a* starts contacting the contact portion 21. Note that a contact surface 21*a* of the contact portion 21 is a vertical surface. In the stage shown in FIG. 8A (the cover portion 13A reaches the closing position), the flat surface portion of the contact surface 131*a* and the contact surface 21*a* of the contact portion 21 contact each other. In this embodiment, the contact surface 131*a* and the contact surface 21*a* contact each other in a direction orthogonal to the rotating shaft of the cover portion 13A (the shaft portion of the cam member 162).

With this configuration, as shown in FIG. 8A, the interference amount can be adjusted by a distance LI from the contact surface between the contact portion 131 and the contact portion 21 to the projecting portion 130*a* and the engaging portion 20. This can minimize the variation of the interference amount caused by the dimension tolerance or assembly error of each component. A user can experience a good click feeling thereby.

<Valves>

The valves 16A and 16B will be described next with reference to FIGS. 9 to 13B. FIGS. 11A to 11C, 12A to 12C, and 13A and 13B are explanatory views of the operation of the valve 16A. The valve 16A simultaneously opens/closes the passages 14*a* and 15*a* (two passages in total) of the container 5Bk. The valve 16B simultaneously opens/closes the passages 14*a* and 15*a* (six passages in total) of the containers 5C to 5Y.

In the printing operation, both the ink supply path 14*a* and the atmosphere communicating path 15*a* need to be open from the viewpoint of ink supply to the discharge head 4. On the other hand, when replenishing ink in the container 5, both the ink supply path 14*a* and the atmosphere communicating path 15*a* need to be closed. When injecting replenishing ink, the inlet portion 5*a* is opened, and the liquid surface of the ink in the container 5 functions as a gas-liquid exchange portion. For this reason, the gas-liquid exchange portion may be higher than the height of the discharge surface 4*a* of the discharge head 4 (FIG. 3). If the ink supply path 14*a* is opened, a pressure by a water head difference corresponding to a height Hm may be applied to the discharge surface 4*a*, and the ink may leak from the discharge surface 4*a*. It is possible to make a design that prevents the liquid surface of the ink in the container 5 from becoming higher than the height of the discharge surface 4*a* of the discharge head 4. However, this causes restrictions on the ink storage amount of the container 5 or the degree of freedom in the design of the liquid discharge apparatus 1 in the Z direction. In addition, if the atmosphere communicating path 15*a* is not closed, the injected ink may flow into the buffer chamber 53. In this case, the buffer chamber 53 may be unable to sufficiently play its role of storing ink pushed out from the storage portion 54 if an atmospheric pressure variation or a temperature change occurs.

From these points, it is necessary to avoid erroneous opening/closing of the passages 14*a* and 15*a* by the valves 16A and 16B. In this embodiment, the valve 16A opens/closes interworking with the movement of the cover portion 3 and the cover portion 13A, and the valve 16B opens/closes interworking with the movement of the cover portion 3 and the cover portion 13B. That is, the cover portion 3 and the cover portions 13A and 13B also serve as an operation portion that accepts the operations of the valves 16A and 16B by the user. This makes it possible to obviate the necessity of a sensor and an actuator, open/close the valves 16A and 16B by the manual operation of the user, and prevent erroneous opening/closing of the valves 16A and 16B.

The valve 16A will be described below. The configuration of the valve 16A will mainly be described here. The valve 16B also has the same configuration.

FIGS. 10A and 10B will be referred to. The valve 16A includes a base member 160, a displacement member 161, the cam member 162, and a case 166. The base member 160 includes a support portion 160*a* having a groove shape in the Y direction, on which the middle portion of the supply tube 14 is placed, and a support portion 160*b* having a groove shape in the Y direction, on which the middle portion of the atmosphere communicating tube 15 is placed. In addition, the base member 160 includes a slot 160*c* extending in a direction crossing the support portion 160*a* and the support portion 160*b* (that is, a direction crossing the tubes 14 and 15), and the displacement member 161 is inserted here to be freely displaced in the Z direction (the radial direction of the tubes 14 and 15). The cam member 162 is a member having a shaft shape as a whole. The cam member 162 is arranged over the displacement member 161 and supported by the case 166 so as to be rotatable about the axis in the X direction. The case 166 stores the center portions of the displacement member 161 and the cam member 162 in the axial direction and is fixed to the base member 160.

The cam member 162 includes, at the center in the axial direction, a cam face 163 that comes into contact with the displacement member 161. The cam face 163 is formed to press the displacement member 161 in a direction of crushing the tubes 14 and 15 as the cam member 162 rotates in a direction D3. This closes the passages 14*a* and 15*a*. The cam face 163 is formed to cancel the pressing of the tubes 14 and 15 as the cam member 162 rotates in a direction D4 (a direction opposite to the direction D3), and the passages 14*a* and 15*a* are thus opened.

At one end portion of the cam member 162 in the axial direction, a lever-shaped contact portion 164 that comes into contact with a contact portion 133 of the cover portion 13A is formed. When the cover portion 13A swings in the opening direction, the contact portion 133 comes into contact with the contact portion 164 to rotate the cam member 162 in the direction D3. At the other end portion of the cam member 162 in the axial direction, a lever-shaped contact portion 165 that comes into contact with a contact portion 3*c* (FIG. 13B) of the cover portion 3 is formed. When the cover portion 3 swings in the closing direction, the contact portion 3*c* comes into contact with the contact portion 165 to rotate the cam member 162 in the direction D4.

FIGS. 11A to 11C show stepwise a mode in which the passage 14*a* is closed. FIG. 11A shows a state in which the valve 16A opens the passage 14*a*. As the cam member 162 rotates in the direction D3, as shown in FIG. 11B, the cam face 163 presses the displacement member 161 against the supply tube 14, and the supply tube 14 starts to be crushed. Then, as shown in FIG. 11C, the supply tube 14 is crushed, and the passage 14*a* is closed. This also applies to the passage 15*a* and the atmosphere communicating tube 15, although not illustrated.

Figure 12A:
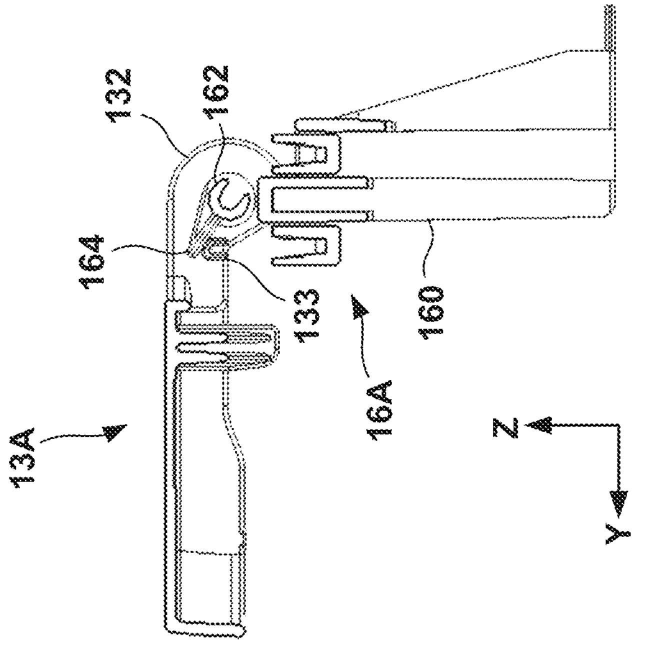
FIGS. 12A to 12C are explanatory views of the operation of the valve.
Figure 12B:
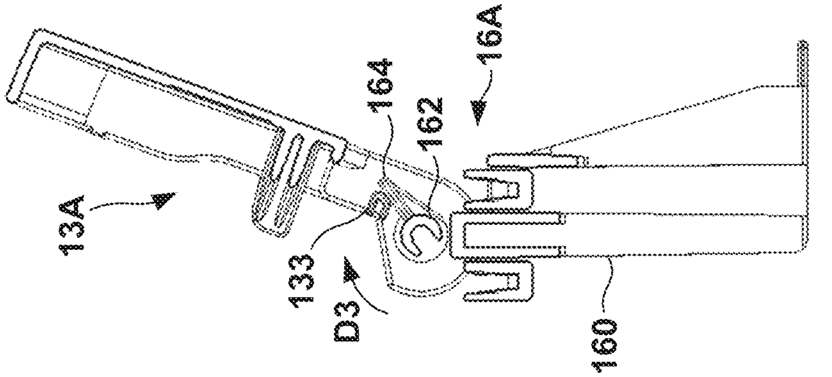
Figure 12C:
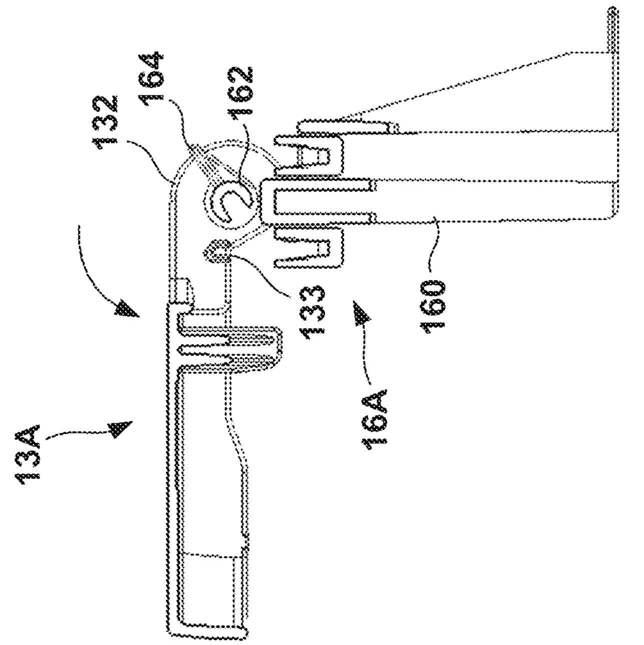

FIGS. 12A to 12C show the rotation mode of the cam member 162 interworking with the movement of the cover portion 13A. FIG. 12A shows a state in which the cover portion 13A is located at the closing position. The valve 16A opens the passages 14*a* and 15*a*. FIG. 12B shows a mode in which the cover portion 13A has moved from the closing position to the opening position. By the contact between the contact portion 133 and the contact portion 164, the cam member 162 rotates in the direction D3 as the cover portion 13A moves. As a result, the passages 14*a* and 15*a* are closed in accordance with the principle described with reference to FIGS. 11A to 11C. When replenishing ink, the passages 14*a* and 15*a* can reliably be closed by the valve 16A.

The contact between the contact portion 133 and the contact portion 164 occurs only when the cover portion 13A swings in the opening direction. Even if the cover portion 13A is returned from the state shown in FIG. 12B to the closing position, as shown in FIG. 12C, the contact portion 133 and the contact portion 164 do not come into contact. Hence, the cam member 162 does not rotate in the direction D4, and the valve 16A does not interwork with the movement of the cover portion 13A.

As described above, in this embodiment, the movement of the cover portion 13A does not cause the opening of the valve 16A. Assuming that the valve 16A is set in an opening state by the moving operation of the cover portion 13A to the closing position, if the moving operation is insufficient, the user may start the printing operation without noticing that the passages 14*a* and 15*a* are closed. This embodiment can prevent such a situation. Also, even if the cover portion 13A is erroneously moved to the closing position before the cap portion 120 sufficiently closes the inlet portion 5*a*, ink leakage from the discharge head 4 or flow-in of ink into the buffer chamber 53 can be prevented because the valve 16A does not open.

Figure 13A:
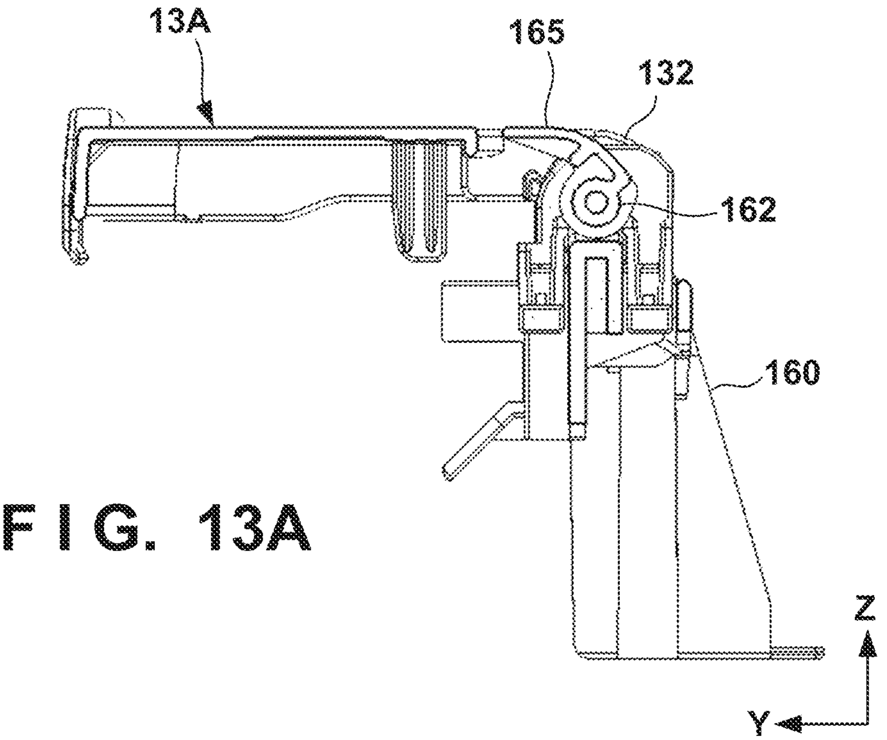
FIGS. 13A and 13B are explanatory views of the operation of the valve.
Figure 13B:
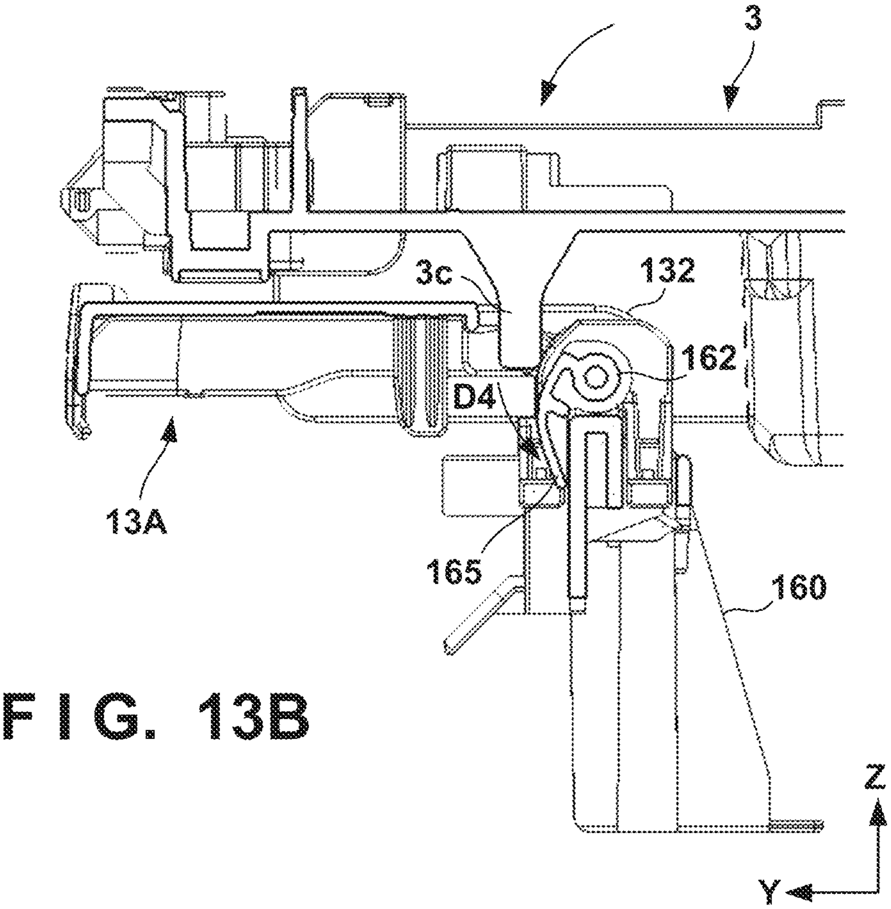

FIGS. 13A and 13B show the rotation mode of the cam member 162 interworking with the movement of the cover portion 3. FIG. 13A shows the same state as in FIG. 12C, in which the valve 16A closes the passages 14*a* and 15*a*, but the cover portion 13A is located at the closing position. When the cover portion 3 is moved from this state to the closing position, the contact portion 3*c* projecting downward from the lower surface of the cover portion 3 comes into contact with the contact portion 165 to rotate the cam member 162 in the direction D4, as shown in FIG. 13B. As a result, the passages 14*a* and 15*a* are opened. When the opening operation of the valve 16A is interworked with the movement of the cover portion 3 to the closing position, the passages 14*a* and 15*a* can more reliably be opened before the printing operation. Note that the contact portion 3*c* is provided for each of the valve 16A and the valve 16B, and when the cover portion 3 is moved to the closing position, both the valve 16A and the valve 16B are simultaneously set in the opening state.

The contact between the contact portion 3*c* and the contact portion 165 occurs only when the cover portion 3 swings in the closing direction. Even if the cover portion 3 is returned from the state shown in FIG. 13B to the opening position, the contact portion 3*c* and the contact portion 165 do not come into contact with each other. Hence, the cam member 162 does not rotate in the direction D3, and the valve 16A or the valve 16B does not interwork with the movement of the cover portion 3. That is, the movement of the cover portion 3 does not cause the closing of the valves 16A and 16B. The purpose of moving the cover portion 3 to the opening position is not limited to replenishment of ink, and this operation concerns general maintenance inside the apparatus main body 2.

Note that in this embodiment, if the cover member 13A or 13B is located at the opening position, the cover portion 13A (or cover portion 13B) is not in a vertical posture but in a standing posture while tilting backward, as shown in FIGS. 5B, 6B, and 12B. Hence, when the user is going to move the cover portion 3 from the opening position to the closing position in this state, the cover portion 3 is prohibited to move to the closing position because of interference with the cover member 13A or 13B. That is, the movement of the cover portion 3 to the closing position is regulated by the opened cover member 13A or 13B. It is therefore possible to prevent the cover portion 3 from erroneously closing and the valve 16A and the valve 16B from being set in the opening state during replenishment of ink.

<Cover Portion Opening/Closing Detection and Example of Control>

Figure 14:
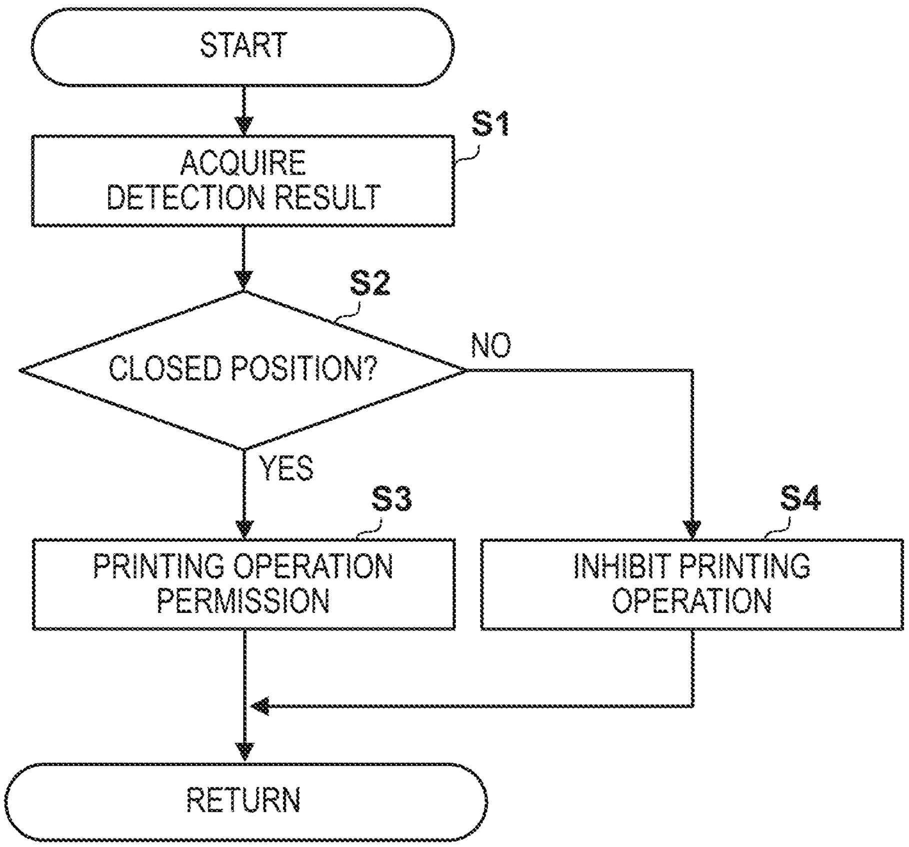
FIG. 14 is a flowchart showing an example of control.

The cover detection sensor 35*a* shown in FIG. 4 detects the position of the cover portion 3. For example, the cover detection sensor 35*a* is a mechanical switch that is pressed when the cover portion 3 is located at the closing position, or a photosensor that optically detects that the cover portion 3 is located at the closing position. As described above, if the cover portion 3 is located at the closing position, the valve 16A and the valve 16B are set in the opening state, and ink can be supplied to the discharge head 4. To prevent the printing operation from being executed in an ink supply disable state, the printing operation may be performed while referring to the detection result of the cover detection sensor 35*a*. FIG. 14 is a flowchart showing an example of processing to be executed by the MPU 31. This processing is setting processing concerning permission and inhibition of execution of the printing operation, and is periodically executed.

In step S1, the detection result of the cover detection sensor 35*a* is acquired. In step S2, it is determined, based on the detection result acquired in step S1, whether the cover portion 3 is located at the closing position. Upon determining that the cover portion 3 is located at the closing position, the process advances to step S3. Upon determining that the cover portion 3 is not located at the closing position, the process advances to step S4.

In step S3, permission of the printing operation is set. If a new print job is instructed from the host computer 100, the printing operation is started. In step S4, inhibition of the printing operation is set. Even if a new print job is instructed from the host computer 100, the printing operation is not started. Also, if inhibition of the printing operation is set during the printing operation, the printing operation is interrupted. A notification may be made to cause the user to move the cover portion 3 to the closing position.

<Maintenance of Seal Performance by Cap Portion>

If the inlet portion 5*a* is closed by the cap portion 120, and a foreign substance such as a hair is sandwiched between these, ink may leak. To prevent such leakage, applying a seal liquid to the seal portion 123 is conventionally known. Even if a foreign substance is sandwiched between the cap portion 120 and the inlet portion 5*a*, the seal liquid fills the gap and prevent leakage of ink.

However, the seal liquid may be erroneously wiped out by the user at the time of replenish ink or the like. If a foreign substance is sandwiched after that, ink may leak. To prevent this, grooves may be formed in the distal end portion 124 of the cap portion 120, and the seal liquid may be applied to the grooves. Since the seal liquid is held in the grooves, it can be prevented from being erroneously wiped out by the user.

Figure 15A:
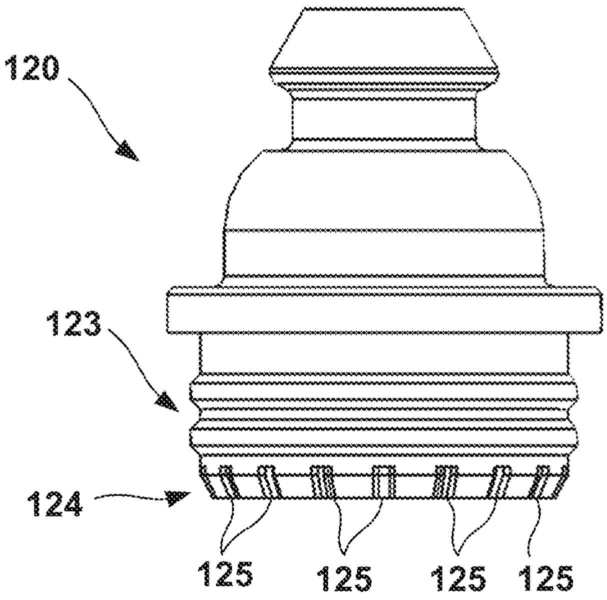
FIG. 15A is a side view of a cap portion.
Figure 15B:
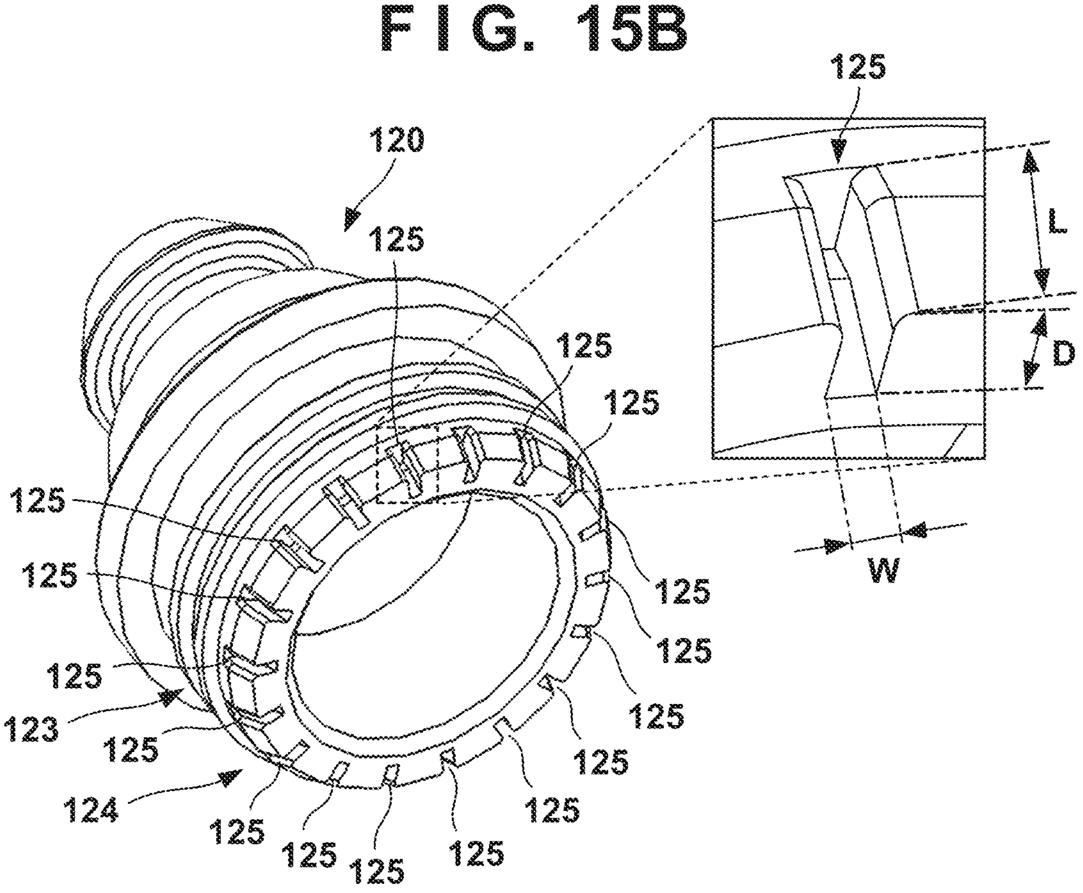
FIG. 15B shows a perspective view and a partial enlarged view of the cap portion.

FIGS. 15A and 15B are views showing an example. FIG. 15A is a side view of the cap portion 120, and FIG. 15B shows a perspective view and a partial enlarged view of the cap portion 120. In the outer peripheral surface of the distal end portion 124, a plurality of grooves 125 are formed in the circumferential direction. In this embodiment, the disposing pitch of the plurality of grooves 125 in the circumferential direction is an equal pitch.

Each groove 125 has a depth D in the radial direction of the opening defined by the distal end portion 124, a width W in the circumferential direction, and a length in a direction tilting with respect to the axial direction. A seal liquid is applied to the seal portion 123 and the distal end portion 124 in advance at, for example, the stage of shipment from the factory, and each groove 125 holds the seal liquid.

Figure 16A:
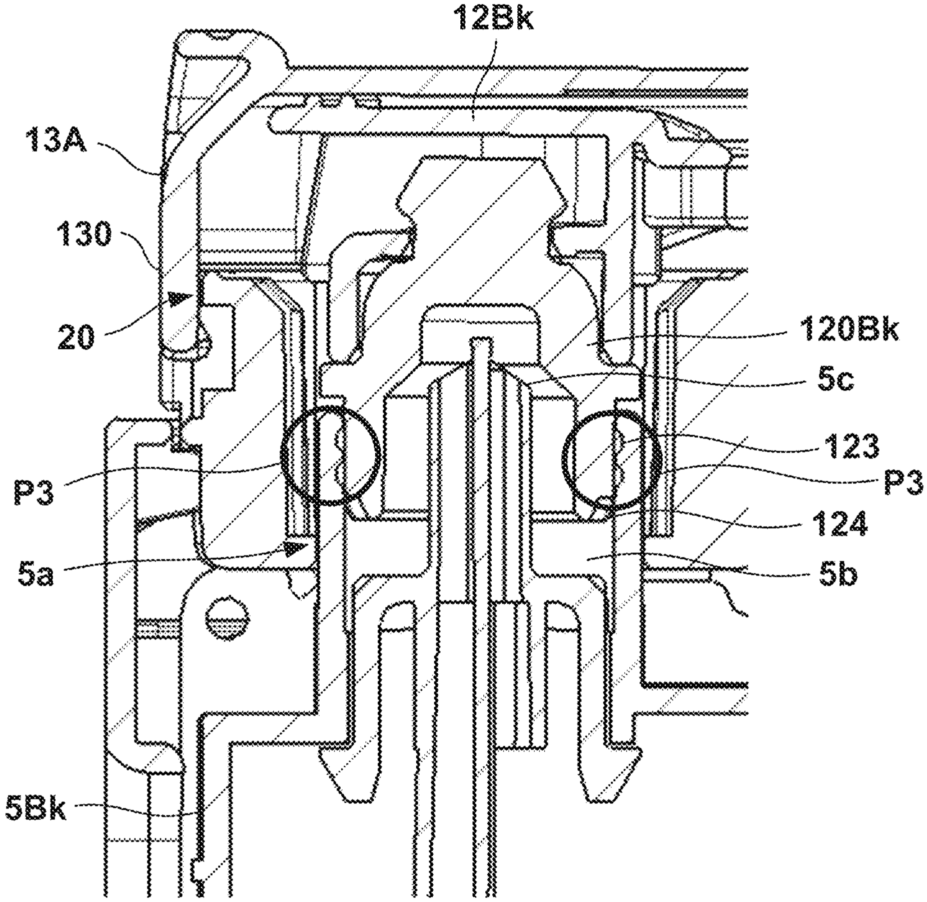
FIG. 16A is a view showing an example of an ink leakage portion.

According to this form, even if the user attempts to wipe the seal liquid on the cap portion 120, the seal liquid in the plurality of grooves 125 exists at deep positions and is never wiped out completely. Hence, even if a foreign substance is sandwiched between the cap portion 120 and the inlet portion 5*a* after that, the seal liquid in the grooves 125 is guided to a gap around the foreign substance by a capillary phenomenon, and leakage of ink can be prevented. For example, even if a foreign substance such as a hair is sandwiched at a portion P3 (a portion between the seal portion 123 and the inner wall surface of the inlet hole 5*b*) surrounded by a circle in FIG. 16A, and a small gap is formed, the seal liquid in the grooves 125 can fill this and prevent leakage of ink.

When the depth D of the grooves 125 is equal to or larger than the width (D≥W), the specific surface area can be increased, and the seal liquid holding performance of the grooves 125 can be improved. The seal liquid may contain a hygroscopic component such as glycerin. This causes the seal liquid to absorb moisture of air in the container 5 and makes it easy to fill the grooves 125 with the seal liquid.

Figure 16B:
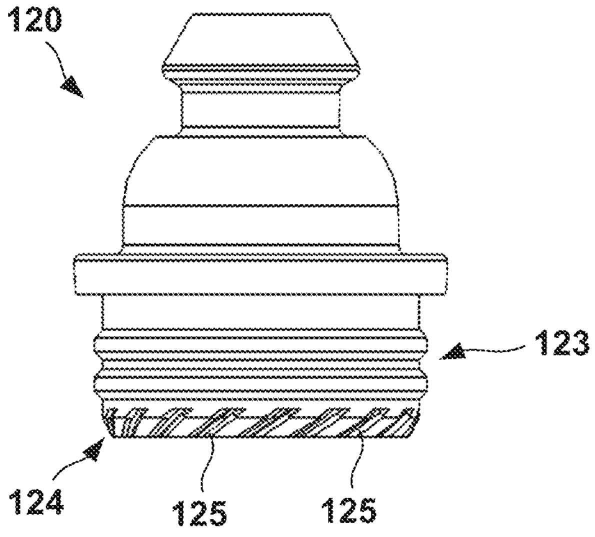
FIGS. 16B and 16C are views showing another configuration example of grooves.
Figure 16C:
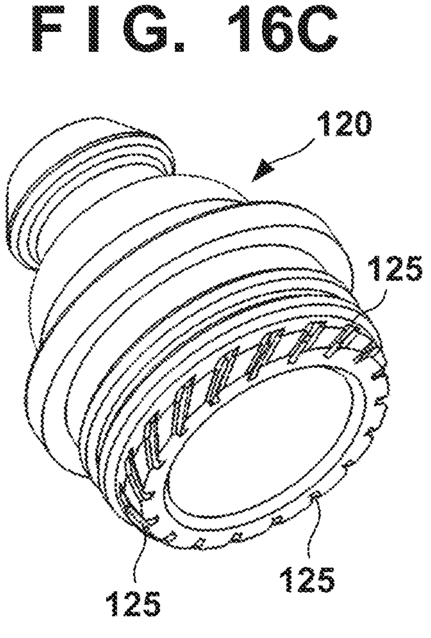

The form of the grooves 125 is not limited to the form shown in FIGS. 15A and 15B. For example, as shown in FIGS. 16B and 16C, the longitudinal direction of each groove 125 may tilt in the circumferential direction with respect to a virtual plane passing through the center axis of the opening defined by the distal end portion 124. Also, in the form according to this embodiment, the cap portion 120 is inserted into the inlet portion 5*a* to close the inlet portion 5*a*. However, a form in which the inlet portion 5*a* is inserted into the cap portion 120 may also be employed. In this case, the grooves 125 may be formed on the inner wall surface of the opening in which the inlet portion 5*a* is inserted.

OTHER EMBODIMENTS

In the above-described embodiment, a configuration example in which the cover portion 3 includes the reading unit (scanner unit)3*a* has been shown. However, the cover portion 3 may not have such a reading function, as represented by the access cover of an SFP (Single Function Printer). In the above embodiment, a configuration in which all of the cover portions 3, 13A, and 13B are moved by swing has been shown. However, these may be moved by translation between the opening position and the closing position. In the above embodiment, a configuration example in which the valve 16 opens/closes both the passage 14*a* and the passage 15*a* has been shown. However, the valve may open/close one of the passages. In the above embodiment, the cover portion 13B common to the containers 5C to 5Y is used. However, each container may be provided with an individual cover portion.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-021066, filed Feb. 12, 2021, which is hereby incorporated by reference herein in its entirety.

What is claimed is:

1. A printing apparatus comprising:

a container including a chamber configured to store ink to be supplied to a printhead configured to discharge the ink, and an inlet hole for injecting the ink into the chamber; and a cap member including a seal portion configured to detachably seal the inlet hole by being inserted into the inlet hole, the cap member configured to be swingably supported with a shaft portion;

wherein the seal portion contacts an inner wall surface of the inlet hole in a state where the seal portion is inserted into the inlet hole, wherein a plurality of grooves is formed in the seal portion and provided at equal intervals in a circumferential direction, wherein the cap member is moved between an opening position to open the inlet hole and a closing position to close the inlet hole, and wherein the plurality of grooves formed in the seal portion is exposed in a state where the cap member is in the opening position.

2. The printing apparatus according to claim 1, wherein the plurality of grooves is formed so as to hold a seal liquid applied to the seal portion.

3. The printing apparatus according to claim 2, wherein the seal liquid contains a hygroscopic component.

4. The printing apparatus according to claim 1, further comprising a top cover configured to cover a top of the printing apparatus, wherein a direction of rotation for opening the top cover is the same as a direction of rotation for opening the cap member.

5. The printing apparatus according to claim 1, further comprising a tank cover configured to cover the container and the cap member.

6. The printing apparatus according to claim 5, further comprising a second container including a second chamber configured to store ink to be supplied to the printhead, wherein the tank cover is configured to cover the second container.

7. The printing apparatus according to claim 6, further comprising a conveying roller configured to convey a print medium in a first direction, wherein the container and the second container are arrayed in a second direction intersecting the first direction.

8. The printing apparatus according to claim 6, further comprising a carriage configured to carry the print head in a second direction, wherein the container and the second container are arrayed in the second direction.

9. The printing apparatus according to claim 1, wherein a remaining amount of ink stored in the chamber is visible on a front of the printing apparatus.

10. The printing apparatus according to claim 1, further comprising an operation unit configured to accept a user operation.

11. The printing apparatus according to claim 1, further comprising a valve configured to open/close a passage from the chamber to the printhead.

12. The printing apparatus according to claim 1, further comprising a tube for supplying the ink in the chamber to the printhead.

13. The printing apparatus according to claim 1, wherein a bottle is inserted into the inlet hole for injecting the ink into the chamber.

14. The printing apparatus according to claim 1, further comprising a recovery unit configured to recover the printhead.

15. The printing apparatus according to claim 1, further comprising the printhead.

16. The printing apparatus according to claim 1, wherein the inlet hole is cylindrical.

17. A printing apparatus comprising:

a container including a chamber configured to store ink to be supplied to a printhead configured to discharge the ink, and an inlet hole for injecting the ink into the chamber; and a cap member including a seal portion configured to detachably seal the inlet hole by being inserted into the inlet hole, the cap member configured to be swingably supported with a shaft portion;

wherein the seal portion contacts an inner wall surface of the inlet hole in a state where the seal portion is inserted into the inlet hole, wherein a plurality of grooves is formed in the seal portion and provided at equal intervals in a circumferential direction, wherein a bottle is inserted into the inlet hole for injecting the ink into the chamber, wherein the ink in the bottle is injected into the container via a tube portion standing in the inlet hole, and wherein the seal portion is between the tube portion and the inner wall surface of the inlet hole in a state where the seal portion is inserted into the inlet hole.

* * * * *